United States Patent
Kim et al.

(10) Patent No.: US 11,017,517 B2
(45) Date of Patent: May 25, 2021

(54) METHOD AND APPARATUS FOR ALLOCATING DIFFERENTIAL BANDWIDTH FOR EACH SCREEN REGION BY USING IMAGE COMPLEXITY INFORMATION

(71) Applicant: SAMSUNG ELECTRONICS CO., LTD., Suwon-si (KR)

(72) Inventors: Kil-jong Kim, Yongin-si (KR); Soon-gi Hong, Seoul (KR); Do-young Joung, Seoul (KR); Chang-hyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/463,450

(22) PCT Filed: Sep. 27, 2017

(86) PCT No.: PCT/KR2017/010656
§ 371 (c)(1),
(2) Date: May 23, 2019

(87) PCT Pub. No.: WO2018/097466
PCT Pub. Date: May 31, 2018

(65) Prior Publication Data
US 2019/0320007 A1 Oct. 17, 2019

(30) Foreign Application Priority Data
Nov. 24, 2016 (KR) .................. 10-2016-0157439

(51) Int. Cl.
*G06T 7/00* (2017.01)
*H04L 29/06* (2006.01)
(Continued)

(52) U.S. Cl.
CPC ........ *G06T 7/0002* (2013.01); *H04L 65/4069* (2013.01); *H04L 65/602* (2013.01);
(Continued)

(58) Field of Classification Search
CPC .............. G06T 7/0002; G06T 2200/16; G06T 2207/20021; G06T 2207/3016;
(Continued)

(56) References Cited

U.S. PATENT DOCUMENTS 6,219,043 B1   4/2001   Yogeshwar et al.
8,514,926 B2   8/2013   Ro et al.
(Continued)

FOREIGN PATENT DOCUMENTS

KR   10-0417783 B1   5/2004
KR   10-0724825 B1   6/2007
(Continued)

OTHER PUBLICATIONS

Martens, "Bandwidth Management for ODV tiled streaming with MPEG-DASH", Thesis, Sep. 20, 2015, Maastricht University (Year: 2015).*

(Continued)

*Primary Examiner* — Diane M Wills
(74) *Attorney, Agent, or Firm* — Sughrue Mion, PLLC

(57) ABSTRACT

Provided are a method and apparatus for allocating differential bandwidth for each screen region by using image complexity information. According to an embodiment, a method and apparatus for receiving streaming data request a server for information relating to content to differentially determine quality of a plurality of regions divided from a predetermined frame of the content according to a network state; among at least one segment for each region encoded with at least one quality for each of the plurality of regions, receive a segment for each region encoded according to the (Continued)

quality for each region determined based on the information relating to the content from the server over a network; generate a reconstruction image for each region by decoding the segment for each region; and merge and render the reconstruction image for each region.

15 Claims, 17 Drawing Sheets

(51) Int. Cl.
  *H04N 21/442* (2011.01)
  *H04N 21/24* (2011.01)
(52) U.S. Cl.
  CPC ......... *H04L 65/80* (2013.01); *H04N 21/2402* (2013.01); *H04N 21/44209* (2013.01); *G06T 2200/16* (2013.01); *G06T 2207/20021* (2013.01); *G06T 2207/20221* (2013.01); *G06T 2207/30168* (2013.01)
(58) Field of Classification Search
  CPC ... H04L 65/4069; H04L 65/602; H04L 65/80; H04N 21/21805; H04N 21/2343; H04N 21/23439; H04N 21/235–2358; H04N 21/2402; H04N 21/44209; H04N 21/44218; H04N 21/6587; H04N 21/816; H04N 21/8456
  See application file for complete search history.

(56) References Cited

U.S. PATENT DOCUMENTS

| | | | |
|---|---|---|---|
| 8,837,601 | B2 | 9/2014 | Ronca et al. |
| 9,155,962 | B2 | 10/2015 | van der Laan et al. |
| 10,165,311 | B2 | 12/2018 | Lee |
| 2012/0207454 | A1 | 8/2012 | Kim |
| 2015/0023404 | A1 | 1/2015 | Li et al. |
| 2015/0134770 | A1 | 5/2015 | Heinz, II et al. |
| 2015/0215621 | A1 | 7/2015 | Liu et al. |
| 2016/0182593 | A1* | 6/2016 | Denoual .......... H04N 21/23439 709/219 |
| 2017/0055012 | A1* | 2/2017 | Phillips .............. H04N 21/2402 |

FOREIGN PATENT DOCUMENTS

| | | |
|---|---|---|
| KR | 10-2012-0094273 A | 8/2012 |
| WO | 2016/129964 A1 | 8/2016 |

OTHER PUBLICATIONS

Communication dated Jul. 2, 2019, issued by the European Patent Office in counterpart European Application No. 17874726.7.
Miska M Hannuksela et al., "Virtual reality video metadata for DASH MPD", 116. MPEG Meeting; Oct. 17-21, 2016; Chengdu; (Motion Picture Expert Group or ISO/IEC JTC1/SC29/WG11), No. m38944, Oct. 12, 2016 (Oct. 12, 2016), XP030067292, (7 pages total).
Mary-Luc Champel, "SRD extensions for VR", 115. MPEG Meeting; May 30, 2016-Jun. 3, 2016; Geneva; (Motion Picture Expert Group or ISO/IEC JTC1/SC29/WG11), No. m38689, May 29, 2016 (May 29, 2016), XP055327844, pp. 1-5 (5 pages total).
Seong Yong Lim et al., "Additional use cases for DASH-SRD", 105. MPEG Meeting; Jul. 29, 2013-Aug. 2, 2013; Vienna; (Motion Picture Expert Group or ISO/IEC JTC1/SC29/WG11), No. m30169, Jul. 20, 2013 (Jul. 20, 2013), XP030058697, (3 pages total).
Lucia D 'Acunto et al., "MPD signalling of 360 content properties for VR applications", 115. MPEG Meeting; May 30, 2016-Jun. 3, 2016; Geneva; (Motion Picture Expert Group or ISO/IEC, JTC1/SC29/WG11), No. m38605, May 25, 2016 (May 25, 2016), XP055327831, (16 pages total).
Mohammad Hosseini et al., "Adaptive 360 VR Video Streaming: Divide and Conquer", Sep. 27, 2016 (Sep. 27, 2016), XP055597359, Retrieved from the Internet: URL:https://arxiv.org/pdf/1609.08729v1.pdf, (6 pages total).
Xin Wang et al., "On Spatial Adaptation in DASH", 105. MPEG Meeting; Jul. 29, 2013-Aug. 2, 2013; Vienna; (Motion Picture Expert Group or ISO/IEC JTC1/SC29/WG11), No. m30341, Jul. 26, 2013 (Jul. 26, 2013), XP030058868, (7 pages total).
Jean Le Feuvre et al., "Tiled-based adaptive streaming using MPEG-DASH", Proceedings of the 7th International Conference on Multimedia Systems, MMSYS' 16, May 13, 2016 (May 13, 2016), XP055466903, New York, New York, USA DOI: 10.1145/2910017.2910641 ISBN: 978-1-4503-4297-1, pp. 1-3, (3 pages total).
Geoffrey Martens: "Bandwidth management for ODV tiled streaming with MPEG-DASH" Thesis, Sep. 20, 2015 (Sep. 29, 2015), XP055589392, Universiteit Hasselt Retrieved from the Internet: URL:https://uhdspace.uhasselt.be/dspace/bitstream/1942/19390/1/12328162016196.pdf [retrieved on May 16, 2019], pp. 1-154 (157 pages total).
Lederer, Stefan, "Optimal Adaptive Streaming Formats MPEG-DASH & HLS Segment Length", https://bitmovin.com/mpeg-dash-hls-segment-length/, Apr. 9, 2015. (10 pages total).
Anonymous, "4K VR 360 Video: What is it and How Can I Produce it?", 360Rize—Realty Inside Zero Edges, 2015, https://www.360rize.com/2015/02/4k-vr-360-video-what-is-it-and-how-can-i-produce-it/. (6 pages total).
International Search Report (PCT/ISA/210) and Written Opinion (PCT/ISA/237) dated Jan. 24, 2018 by the International Searching Authority in counterpart International Patent Application No. PCT/KR2017/010656.

* cited by examiner

METHOD AND APPARATUS FOR ALLOCATING DIFFERENTIAL BANDWIDTH FOR EACH SCREEN REGION BY USING IMAGE COMPLEXITY INFORMATION

TECHNICAL FIELD

The present disclosure relates to a method and apparatus for transmitting and receiving streaming data, and more particularly, to a method and apparatus for transmitting and receiving streaming data adaptively according to a change in a network environment.

BACKGROUND ART

There are a downloading method and a streaming method as methods of transmitting media data over a network. The streaming method is a method in which a server transmits media data in real time and a client reproduces the received media data in real time.

In the streaming method, media data is transmitted and received in real time through a logical channel set between a server and a client, unlike the downloading method in which media data is reproduced after the media data is all transmitted and received. Therefore, there is a need for a method and apparatus capable of maintaining quality of service (QoS) of the reproduction of the media data by reflecting a change in a streaming environment.

On the other hand, Dynamic Adaptive Streaming over HTTP (DASH) technology has recently been established in the MPEG Forum for more efficient use of high-quality streaming services and networks. The DASH technology prepares segments encoded with various qualities (bit rates) in advance for the same content and sends the encoded segments with the corresponding quality according to a network bandwidth measured at the time of streaming. The technology has an advantage of being able to adjust streaming adaptively to the network bandwidth.

However, in the case of a virtual reality (VR) image, which has recently been popularized, because the VR image must include all regions of all directions (360 degrees), there are many cases where complexity differs depending on a region. In this case, when encoding is performed with the same quality on all the regions regardless of a low complexity region and a high complexity region, available network bandwidths need to be uniformly distributed to all the regions. Therefore, there is a problem that a viewer may sense deterioration in image quality in the high complexity region requiring relatively high quality reproduction. Accordingly, there is a need for a technology for efficiently allocating limited network bandwidths for each spatial region.

DESCRIPTION OF EMBODIMENTS

Technical Problem

Provided are a method and apparatus for transmitting and receiving streaming data adaptive to a network bandwidth by generating at least one segment encoded with various qualities for each divided region of a content screen.

Solution to Problem

According to an aspect of the present disclosure, a method of receiving streaming data includes requesting a server for information relating to content to differentially determine quality of a plurality of regions divided from a predetermined frame of the content, according to a network state; among at least one segment for each region encoded with at least one quality for each of the plurality of regions, receiving a segment for each region encoded according to the quality for each region determined based on the information relating to the content from the server over a network; generating a reconstruction image for each region by decoding the segment for each region; and merging and rendering the reconstruction image for each region.

The information relating to the content may include additional information including importance information with respect to the plurality of regions and segment information with respect to the at least one segment for each region, wherein the importance information with respect to the plurality of regions includes at least one of complexity information with respect to the plurality of regions, object state information, and information about whether viewing is possible; and wherein the segment information includes at least one of quality information of the at least one segment for each region and location information of the at least one segment for each region within the predetermined frame.

The method may further include: inspecting a state of the network; generating a quality configuration candidate group for each of the plurality of regions, based on the state of the network; and selecting a quality for each region from the quality configuration candidate group for each region, based on the importance information with respect to the plurality of regions.

The additional information may include information indicating a quality of each network state with respect to each of the plurality of regions, and the method may further include: inspecting a state of the network; and determining a quality for each region, based on information indicating the state of the network and a quality for each network state.

The quality configuration candidate group for each region is generated based on the state of the network and extracted region of interest information.

The quality for each region is determined based on the state of the network, information indicating the quality for each network state, and extracted region of interest information.

The method may further include: transmitting extracted region of interest information to the server, wherein the quality for each region is determined based on the region of interest information.

The method may further include: inspecting a state of the network; determining whether to determine the quality for each region based on a region of interest; and when the quality for each region is determined based on region of interest information: extracting the region of interest information; and determining quality information for each region based on the region of interest, or when the quality for each region is not determined based on the region of interest: generating a quality configuration candidate group for each of the plurality of regions based on the state of the network; and selecting the quality for each region among the quality configuration candidate group for each region based on the importance information with respect to the plurality of regions.

The method may further include: inspecting a state of the network; determining whether to determine the quality for each region based on a region of interest; and when the quality for each region is determined based on region of interest information: extracting the region of interest information; and determining quality information for each region based on the region of interest, or when the quality for each region is not determined based on the region of interest: determining the quality information for each region based on quality information for each network state with respect to each of the plurality of regions included in the additional information.

According to an aspect of the present disclosure, a method of transmitting streaming data includes dividing a predetermined frame of content into a plurality of regions to differentially determine quality according to a network state; generating at least one segment for each region by performing encoding on each of the plurality of regions with at least one quality; and transmitting to a client over a network a segment for each of the encoded plurality of regions according to a quality for each region among the at least one segment for each region.

The method may further include: generating additional information including importance information with respect to the plurality of regions and segment information with respect to the at least one segment for each region; and transmitting the additional information to the client over the network, wherein the importance information with respect to the plurality of regions includes at least one of complexity information with respect to the plurality of regions, object state information, and information about whether viewing is possible; and wherein the segment information includes at least one of quality information of the at least one segment for each region and location information of the at least one segment for each region within the predetermined frame.

The generating of the additional information may include: determining a quality for each network state with respect to each of the plurality of regions, based on the importance information with respect to the plurality of regions; and generating the additional information including the segment information and information indicating the quality for each network state.

The method may further include: inspecting a state of the network; generating a quality configuration candidate group for each of the plurality of regions, based on the state of the network; and selecting a quality for each region from the quality configuration candidate group for each region, based on the importance information with respect to the plurality of regions.

The method may further include: receiving region of interest information from the client; inspecting a state of the network; generating a quality configuration candidate group for each of the plurality of regions, based on the region of interest information and the state of the network; and selecting a quality for each region from the quality configuration candidate group for each region, based on the importance information with respect to the plurality of regions.

According to an aspect of the present disclosure, an apparatus for receiving streaming data includes a data transceiver configured to request a server for information relating to content to differentially determine quality of a plurality of regions divided from a predetermined frame of the content according to a network state, and, among at least one segment for each region encoded with at least one quality for each of the plurality of regions, receive a segment for each region encoded according to the quality for each region determined based on the information relating to the content from the server over a network; a decoder configured to generate a reconstruction image for each region by decoding the segment for each region; and a renderer configured to merge and render the reconstruction image for each region.

According to an aspect of the present disclosure, an apparatus for transmitting streaming data includes a screen region divider configured to divide a predetermined frame of content into a plurality of regions to differentially determine a quality according to a network state; an encoder configured to generate at least one segment for each region by performing encoding on each of the plurality of regions with at least one quality; and a data transceiver configured to transmit to a client over a network a segment for each of the encoded plurality of regions according to a quality for each region among the at least one segment for each region.

Advantageous Effects of Disclosure

According to embodiments, it is possible to transmit and receive streaming data adaptive to a network bandwidth, thereby efficiently utilizing the limited network bandwidth.

MODE OF DISCLOSURE

Figure 1:
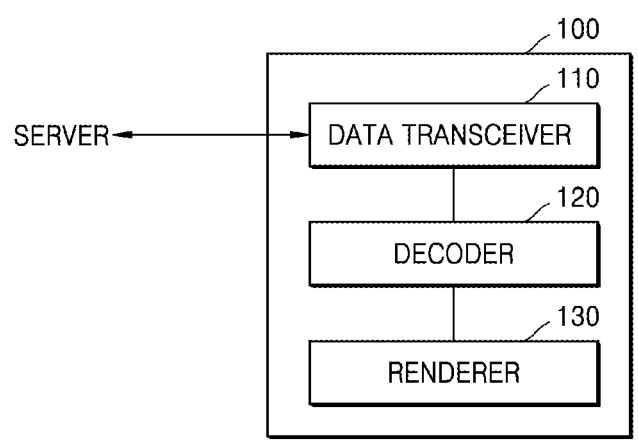
FIG. 1 is a schematic block diagram of a streaming data receiving apparatus 100 according to an embodiment.

As the present disclosure allows for various changes and numerous embodiments, various embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in present disclosure. In the drawings, like reference numerals denote like elements.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or," includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

The terms used in the present specification are merely used to describe embodiments, and are not intended to limit the present disclosure. An expression used in the singular encompasses the expression of the plural, unless it has a clearly different meaning in the context. In the present specification, it is to be understood that the terms such as "including", "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined herein, all the terms used herein, which include technical or scientific terms, may have the same meaning that is generally understood by a person skilled in the art. It will be further understood that terms, which are defined in a dictionary, should also be interpreted as is customary in the relevant related art and not in an idealized or overly formal meaning unless expressly so defined herein in this specification.

Reference will now be made in detail to embodiments, examples of which are illustrated in the accompanying drawings.

FIG. 1 is a schematic block diagram of a streaming data receiving apparatus 100 according to an embodiment.

Referring to FIG. 1, the streaming data receiving apparatus 100 according to an embodiment may include a data transceiver 110, a decoder 120, and a renderer 130.

The data transceiver 110 according to an embodiment may transmit a request for transmitting information relating to content to a server and receive the requested information from the server in response thereto. The information relating to the content according to an embodiment may be additional information. Here, the additional information may include complexity information with respect to a plurality of regions divided from a predetermined frame of the content, object state information, information about whether viewing is possible, quality information of at least one segment for each region, location information in a predetermined frame of the at least one segment for each region, and the like. However, the additional information is not limited to the above-described example, and may include media presentation description (MPD) information and all peripheral information related to the content.

Also, the data transceiver 110 may transmit a request for transmitting information about the content to the server and receive the requested information. The information about the content according to an embodiment may be information about a segment for each encoded region. Here, the segment means that a region divided from a predetermined frame of the content is encoded with a predetermined quality. On the other hand, in order to enable adaptive streaming to the network bandwidth, a region within a predetermined frame may be encoded in advance in one or more qualities at a server end. Therefore, there may be one or more segments for each quality in each region. For example, a high quality encoded segment and a low quality encoded segment may exist simultaneously with respect to one region. Accordingly, the segment for each region is that the region divided from the predetermined frame of the content is encoded with the predetermined quality and is a data unit of a spatially divided bit stream. At this time, as described above, because there may be one or more segments for each quality in each region, at least one segment may exist in each region.

The decoder 120 according to an embodiment may generate a reconstruction image for each region by decoding the segment for each region received from the server in the data transceiver 110.

The renderer 130 according to an embodiment may merge and render the reconstruction image for each region generated by the decoder 120.

Figure 2:
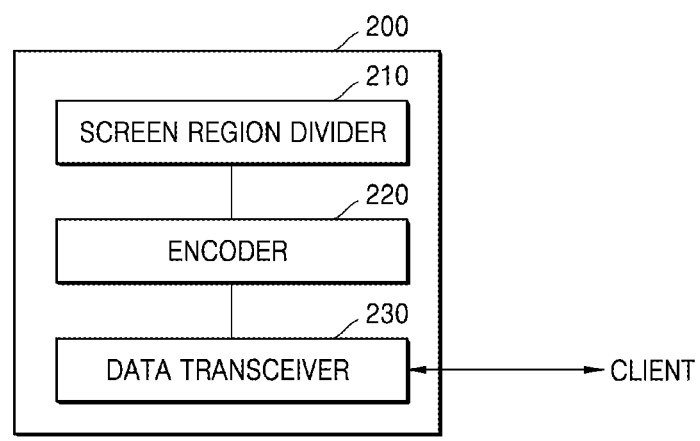
FIG. 2 is a schematic block diagram of a streaming data transmitting apparatus 200 according to an embodiment.

FIG. 2 is a schematic block diagram of a streaming data transmitting apparatus 200 according to an embodiment.

Referring to FIG. 2, the streaming data transmitting apparatus 200 according to an embodiment may include a screen region divider 210, an encoder 220, and a data transceiver 230.

The screen region divider 210 according to an embodiment may divide a predetermined frame of content into a plurality of regions in order to differentially determine quality according to network conditions.

The encoder 220 according to an embodiment may encode each of the plurality of regions divided by the screen region divider 210 with at least one quality to generate at least one segment for each region.

The data transceiver 230 according to an embodiment may receive a request for transmitting information relating to content from a client and transmit the requested information in response thereto. The information relating to the content according to an embodiment may be additional information.

Also, the data transceiver 230 may receive the request for transmitting the information about the content from the client and transmit the requested information. The information about the content according to an embodiment may be a segment for each encoded region. As described above, the segment for each encoded region is that a region divided from a predetermined frame of the content is encoded with a predetermined quality and is a data unit of a spatially divided bit stream.

Figure 3:
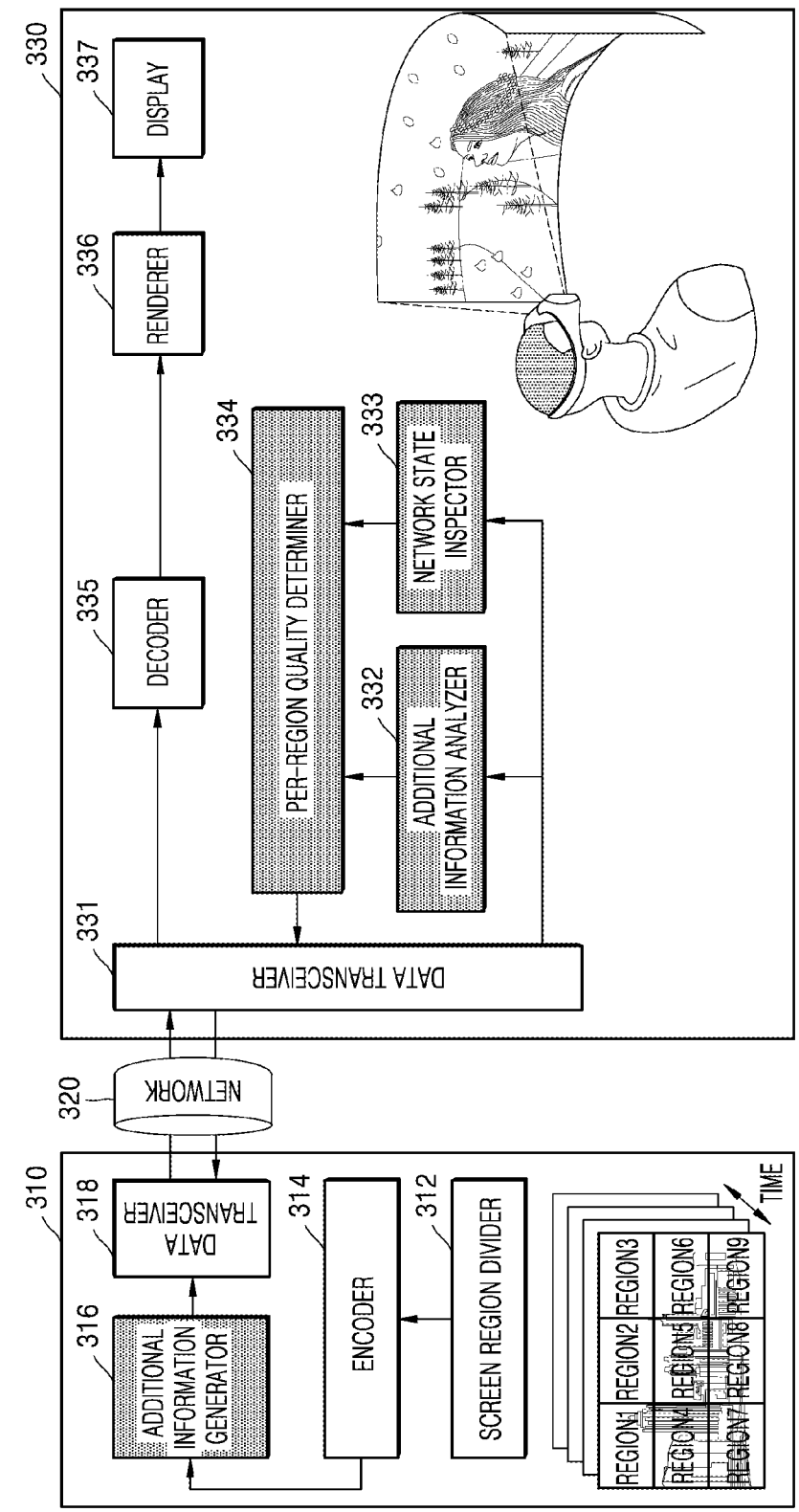
FIG. 3 is a diagram for explaining a content streaming service providing environment 300 according to an embodiment.

FIG. 3 is a diagram for explaining a content streaming service providing environment 300 according to an embodiment.

In the content streaming service providing environment 300 according to an embodiment, a server 310 may access a client 330 over a network 320. Also, the server 310 according to an embodiment may interoperate with a database (not shown) in which source media data is stored and managed. Here, the server 310 may correspond to the streaming data transmitting apparatus 200 of FIG. 2, and the client 330 may correspond to the streaming data receiving apparatus 100 of FIG. 1. The network 320 may also include a mobile communication network such as WCDMA, HDPA, 3G, 4G, etc., a near distance communication network such as Bluetooth, Zigbee, Wi-Fi, etc., and a wired communication network such as Internet, PSTN, etc. Also, the database (not shown) may be a cloud media server or a separate storage. Content that constitutes the source media data may be provided from various sources through the network 320. For example, the various sources may include a media server storing media files, a 3G camera, an IP camera, an analog camera, a PC, a storage server, a laptop, a smart phone, a web hard, a smart phone, etc. The various sources may also include a set-top box that provides a live stream, a camera, a hardware encoder that digitally compresses video signals, a PC, a smart phone, a tablet PC, and the like.

When the server 310 streams data to the client 330, a streaming environment may be changed. For example, a bandwidth of the network 320 for streaming may be changed, and hardware resources available to the server 310 to transmit data or hardware resources available to the client 330 to receive data may be changed.

Accordingly, the server 310 may divide a predetermined frame of the content into a plurality of regions and encode the divided regions with different quality for adaptive streaming in accordance with a flexible streaming environment. The server 310 may encode the divided regions into a plurality of different qualities by adjusting factors such as a bit rate, a sampling frequency, a resolution, or a frame rate. For example, the server 310 may encode each divided region at various resolutions such as high quality (e.g., 16 Mbps), medium quality (e.g., 12 Mbps), low quality (e.g., 4 Mbps), etc., thereby generating at least one segment for each region.

On the side of the server 310 or the client 330, an optimum quality configuration suitable for an available bandwidth of the network 320 may be determined. The quality configuration may mean quality (i.e., quality for each region) for each of the plurality of regions. According to an embodiment, the quality may be determined differently for each region, and the quality configuration may be different for each frame of the content. By distributing available bandwidth resources of the limited network 320 differently to the respective regions according to the importance of each region, it is possible to minimize deterioration of the image quality in a region of high importance (e.g., complexity) and to maximize the bandwidth utilization. According to another embodiment, after the same bandwidth is allotted to all the regions, a remaining network bandwidth may be further allocated to the region of high importance.

The server 310 may transmit only a segment for each region according to the determined quality configuration among the at least one segment for each region to the client 330. At this time, the quality configuration (that is, quality for each region) may be determined on the side of the server 310 or the client 330. That is, the server 310 may check a network status to determine a quality configuration suitable for the network status, or the client 330 may check the network status to determine the quality configuration suitable for the network status.

The quality configuration (i.e., quality for each region) according to an embodiment may be determined based on the network status and importance information with respect to the plurality of regions. Here, the importance information with respect to the plurality of regions is information included in additional information generated by the server 310, and may mean complexity information about the plurality of regions, object state information, information about whether viewing is possible, and the like. For example, high quality may be assigned to a high complexity region among the plurality of regions, and relatively low quality may be assigned to a low complexity region. Accordingly, when the server 310 determines the quality configuration, the server 310 does not need to transmit the importance information with respect to the plurality of regions to the client 330, and the server 310 does not need to generate additional information including the importance information with respect to the plurality of regions. On the other hand, when the client 330 determines the quality configuration, the client 330 needs to receive the additional information from the server 310 because the client 330 must determine the quality configuration based on the importance information with respect to the plurality of regions.

Meanwhile, the additional information generated by the server 310 may include not only importance information with respect to the plurality of regions but also quality information of the at least one segment for each region and location information within a frame of the at least one segment for each region. Also, the additional information may include information such as a title of the content, synopsis, a content ID, a content uniform resource locator (URL), and the like.

According to an embodiment, the client 330 may estimate a streaming environment and select one segment for each region of the at least one segment for each region based on the estimated streaming environment. The selected segment for each region may be encoded in quality to maintain a suitable QoS in the estimated streaming environment. The client 330 may then transmit a request to the server 310 requesting transmission of the selected segment for each region.

Hereinafter, the configuration of the server 310 will be described in detail.

Referring to FIG. 3, the server 310 according to an embodiment may include a screen region divider 312, an encoder 314, an additional information generator 316, and a data transceiver 318.

The screen region divider 312 according to an embodiment may divide a predetermined frame of the content into a plurality of regions. The screen region divider 312 may determine a division range of a screen region. Also, the screen region divider 312 may determine the size and number of the plurality of regions to be divided. Information about a location and size of each of the regions divided by the screen region divider 312 may be stored in additional information (for example, MPD information). An example of a method of describing the information about the location and size of each of the divided regions will be described later with reference to FIG. 4.

The encoder 314 according to an embodiment may generate at least one segment for one region by encoding each of the regions divided by the screen region divider 312 with at least one quality. The encoder 314 may encode each of the divided regions with the at least one quality by adjusting factors such as a bit rate, a resolution, a frame rate, and the like. Thus, there may be a difference in a predetermined bit rate, resolution, or frame rate between the segments for each region.

On the other hand, the encoder 314 may subdivide the segments for each region at a predetermined time interval. At this time, the time interval on which division is based may be set based on a group of pictures (GOP). The generated segments may be stored in the server 310. Each segment may be assigned with a URL path corresponding thereto. Thus, the segment represents a data unit of a spatially and/or temporally divided bit stream provided on request by the client 330. When a space and/or time interval for dividing the segment are narrowed, the number of segment files and the number of URLs of the segments are increased, instead of having a segment level of a high conversion unit according to a state of the network and a similar aspect to real-time streaming.

The additional information generator 316 may generate and store additional information based on information about a segment. The additional information may describe information about at least one segment for each region and include information that needs to be recognized by the client 330 to perform decoding and rendering such as a temporal location of content corresponding to the segment, a spatial location, quality, a URL, a size, etc. In other words, the server 310 stores an entire content file in fragments of a temporally and spatially appropriate size in order to quickly respond to a dynamic network state. The additional information generator 316 included in the server 310 generates information necessary for streaming the fragmented files with optimum quality as a separate file called the additional information.

On the other hand, in order to configure the spatially divide segments with optimum quality for each region, because it is necessary to consider the importance of each divided region, the additional information may include not only information about the segments but also importance information about the plurality of divided regions. Here, the importance information may include complexity information with respect to the plurality of regions, object state information, information about whether viewing is possible, and the like.

The data transceiver 310 according to an embodiment may receive a request of transmission of the additional information and the segment file from the client 330. Also, the data transceiver 310 may transmit the additional information and the segment file according to the request from the client 330. Also, the data transceiver 310 may receive region of interest information of the content from the client 330.

Hereinafter, the configuration of the client 330 will be described in detail.

The client 330 includes all terminals equipped with an application capable of streaming various contents such as music files, 2D or 3D video content, VR image content, etc. For example, the client 330 may be implemented as all communication apparatuses such as a VR image receiving/reproducing device, a cellular phone, a personal communication service (PCS) phone, a synchronous/asynchronous International Mobile Telecommunication-2000 (IMT-2000) terminal as well as a notebook PC, a desktop PC, a palm personal computer (PC), a personal digital assistant (PDA), a smart phone, a wireless application protocol (WAP) phone, a mobile play-station, etc.

The network 320 between the client 330 and the server 310 may support various types of network protocols such as a wired Internet network, a wireless Internet network, a Wibro, a WCDMA, a CDMA2000, a LAN, etc. A transmission channel of multimedia data may be obtained over the network 320.

Referring to FIG. 3, the client 330 according to an embodiment may include a data transceiver 331, an additional information analyzer 332, a network state inspector 333, a per-region quality determiner 334, a decoder 335, a renderer 336, and a display 337.

The data transceiver 331 according to an embodiment may transmit a request of transmission of the additional information and the segment file to the server 310. The data transceiver 331 also receives the additional information and the segment file from the server 310. Also, the data transceiver 331 may transmit the region of interest information of the content to the server 310.

The additional information analyzer 332 according to an embodiment collects information about a temporal location of content of a segment to be received, a spatial location, quality, a URL, size, and the like based on the additional information received from the server 310. Also, the additional information analyzer 332 may obtain complexity information about the plurality of regions, object state information, information about whether viewing is possible, etc.

The network state inspector 333 according to an embodiment may measure and predict a state of the network 320 for streaming. The network state inspector 333 may measure a bandwidth of the network 320 connected to the server 310 at a predetermined time interval. When the bandwidth of the network 320 changes rapidly, the network state inspector 333 may measure the bandwidth by setting the time interval to be short and, when the bandwidth of the network 320 changes slowly, measure the bandwidth by setting the time interval to be long.

Meanwhile, the network state inspector 333 may use various methods of predicting the state of the network 320 based on available hardware resources of the server 310 or the client 330. For example, the client 330 may predict the state of the network 320 based on a time stamp and a bit error rate (BER) of a received bit stream. The network state inspector 333 may check the time stamp of the received bit stream and predict that the state of the network 320 is deteriorating when streaming data is received at a rate lower than a reproducing speed. Also, the network state inspector 333 may predict that the state of the network 320 is deteriorating even when the BER of the received bit stream increases.

The per-region quality determiner 334 according to an embodiment may determine the most suitable per-region quality in the state of the network 320 by analyzing the state of the network 320 measured and predicted by the network state inspector 333.

More specifically, the per-region quality determiner 334 may generate a quality configuration candidate group for each region suitable for the state of the network 320. The available network bandwidth refers to the remaining bandwidth excluding a currently used portion in a bandwidth entire capacity of a network link. The quality configuration candidate group for each region may mean various combinations of quality (a bit rate) that may be allocated for a plurality of regions, in order to enable seamless media reproduction based on the available network bandwidth.

For example, it is assumed that the network bandwidth available for a predetermined frame is 12 Mbps and the predetermined frame is divided into 8 regions. It is assumed that a high quality bit rate is 2 Mbps, a medium quality bit rate is 1.5 Mbps, and a low quality bit rate is 0.5 Mbps for one region. In this case, as an example, there may be a quality configuration for each region in which the medium quality bit rate is assigned to all regions. As another example, there may be a quality configuration for each region in which the high quality bit rate is assigned to four regions, the medium quality bit rate is assigned to two regions, and the low quality bit rate is assigned to the remaining two regions.

As described above, a bit rate according to a predetermined quality may be allocated to each region based on the available bandwidth, and combinations of bit rates that may be allocated to each region may vary. Therefore, the number of quality configuration candidate groups for each region increases as the available network bandwidth increases, and the number of quality configuration candidate groups for each region increases as types of quality are variously set.

Thereafter, the per-region quality determiner 334 may select an optimum quality configuration for each region from the quality configuration candidate group for each region, based on the importance information and/or the segment information with respect to the plurality of regions obtained by the additional information analyzer 332. As described above, the importance information with respect to the plurality of regions may include complexity information with respect to the plurality of regions, object state information, information about whether viewing is possible, and the like, and the segment information may include information about a temporal location of content corresponding to the segment for each region, a spatial location, quality, a URL, a size, etc.

For example, the per-region quality determiner 334 may allocate high quality (a high bandwidth) for a high complexity region and low quality (a low bandwidth) for a low complexity region to minimize deterioration of image quality that a viewer feels and maximize bandwidth utilization, and enable streaming adaptive to the state of the network 320. The above-described streaming adaptive to the state of the network 320 is possible by dividing a content image into a plurality of regions and encoding each of the divided regions with at least one quality.

Also, the per-region quality determiner 334 analyzes the state of the network 320 to determine a bit rate most suitable for the state of the network 320, and based on a result of determination, requests a segment suitable for a current communication network environment from the server 310 through the data transceiver 331 to receive the segment. On the other hand, when it is determined that it is impossible to continuously reproduce content by continuously receiving a current bit stream due to deterioration of a streaming environment, the per-region quality determiner 334 may request a segment of a bit stream encoded with quality lower than that of the currently receiving bit stream and when it is possible to continuously reproduce the content even though a bit stream encoded with quality higher than that of the currently receiving bit stream is received owing to improvement of the streaming environment, request a segment of the bit stream encoded with quality higher than that of the currently receiving bit stream.

The decoder 335 according to an embodiment may decode the segment for each region received from the server 310 in the data transceiver 331 to generate a reconstruction image for each region.

The renderer 336 according to an embodiment may merge and render the reconstruction image for each region generated by the decoder 335.

The display 337 according to an embodiment may reproduce and display the rendered image.

Figure 4:
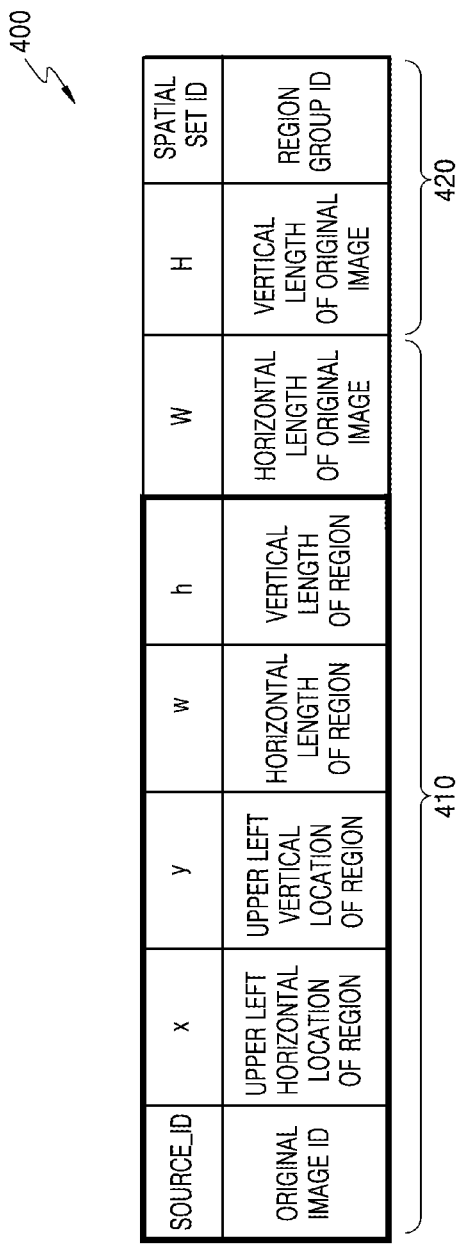
FIG. 4 is a diagram for explaining an example of a method of describing information about a location and size of each of divided regions.

FIG. 4 is a diagram for explaining an example of a method of describing information about a location and size of each of divided regions. However, the method of describing the information of each region in an embodiment is not limited to FIG. 4, and the information description method shown in FIG. 4 may be an example of an information description method among various embodiments.

Referring to FIG. 4, region spatial information 400 may be described for each region divided from a predetermined frame of content. The region spatial information 400 may include information about at least one of a location, number, and size of each divided region. The region spatial information 400 may be included in additional information. Here, the additional information may represent an MPD in a different sense, and the region spatial information 400 may refer to a spatial relationship description (SRD).

The region spatial information 400 according to an embodiment may include information about an original image ID source_id, an upper left horizontal location x of the corresponding region based on an original image, an upper left vertical location y of the corresponding region, a horizontal length w of the corresponding region, and a vertical length y of the corresponding region. The above-described information may be mandatory information 410 that must be mandatorily included in the region spatial information 400.

In addition to the mandatory information 410, the region spatial information 400 may further selectively include selection information 420 about a horizontal length W of the original image, a vertical length H of the original image, and a region group ID spatial_set_id.

The region spatial information 400 according to an embodiment may be used as a reference to importance information about a plurality of regions that are the basis for determining quality for each region. Also, the region spatial information 400 may be used to describe location information of at least one segment for each region.

Figure 5:
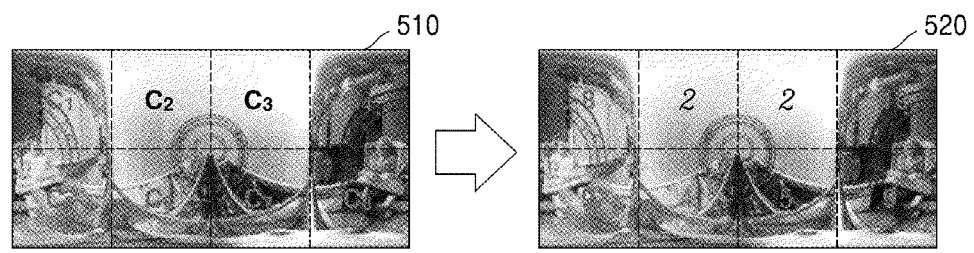
FIG. 5 illustrates a method of scoring importance for each region based on complexity of a plurality of divided regions according to an embodiment.

FIG. 5 illustrates a method of scoring importance for each region based on complexity of a plurality of divided regions according to an embodiment.

Complexity information 510 according to an embodiment may be generated in the server 310. The complexity information 510 is data representing complexity of an image numerically. The complexity information 510 is stored in units of spatially divided regions. For example, the complexity information 510 may indicate the complexity of an entire region using complexity (i.e., $c1, c2, c3, c4, c5, c6, c7, c8$) for each region. Also, the complexity information 510 may be stored in units of temporally divided time intervals. The complexity according to an embodiment may be data representing relation between pixels by numerical value, grade, degree, and the like and may be calculated based on an equation for calculating the complexity. The equation for calculating the complexity is not limited to a specific equation. For example, a flat region such as the sea or sky has a low complexity, while a region having an irregular arrangement of pixels, such as people or a building, tends to have a high complexity.

According to an embodiment, the server 310 may use the complexity information 510 to score the complexity of each region. For example, high importance may be scored in the order of high complexity among the entire regions. The importance of each region converted to a numerical value or a grade may be included in each-region importance information 520. A high importance region is relatively more complex than a low importance region, which may mean that the high importance region needs to be encoded with high quality.

The each-region importance information 520 according to an embodiment may include various factors such as a state of an object in a region and whether viewing of the corresponding region is possible, as well as information about the complexity for each region.

Figure 6A:
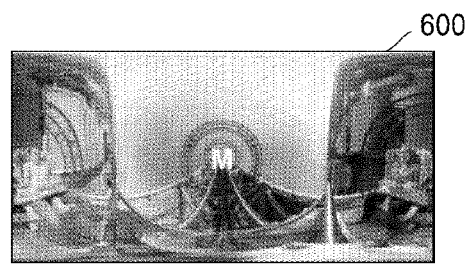
FIGS. 6A and 6B are diagrams of an image 600 configured in a single quality.
Figure 6B:
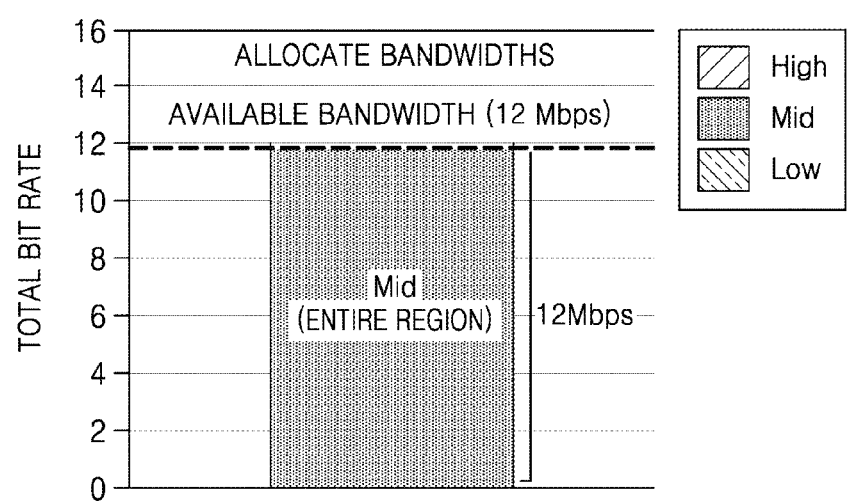

FIGS. 6A and 6B are diagrams of an image 600 configured in a single quality.

Referring to FIGS. 6A and 6B, an example in which an image is encoded with a predetermined quality based on an available network bandwidth is illustrated. According to the example shown in FIGS. 6A and 6B, because the available network bandwidth is 12 Mbps, an entire region of the image is encoded with a quality of 12 Mbps. At this time, because a screen division is not performed on the image, all the regions are configured with the same quality. That is, the available network bandwidth is evenly distributed to all the regions regardless of a low complexity region and a high complexity region.

Figure 7A:
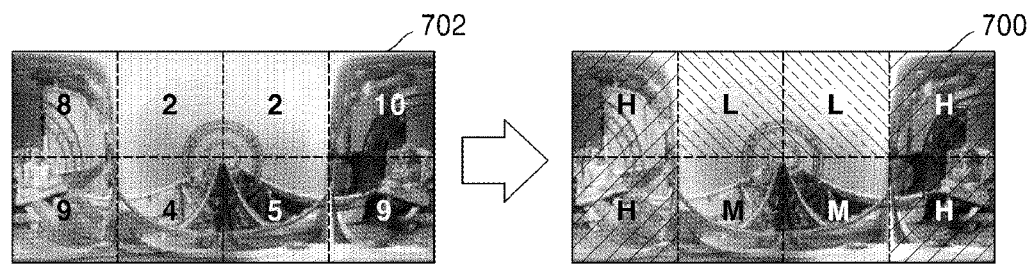
FIGS. 7A and 7B are diagrams of an image 700 configured in a differential quality for each region according to an embodiment.
Figure 7B:
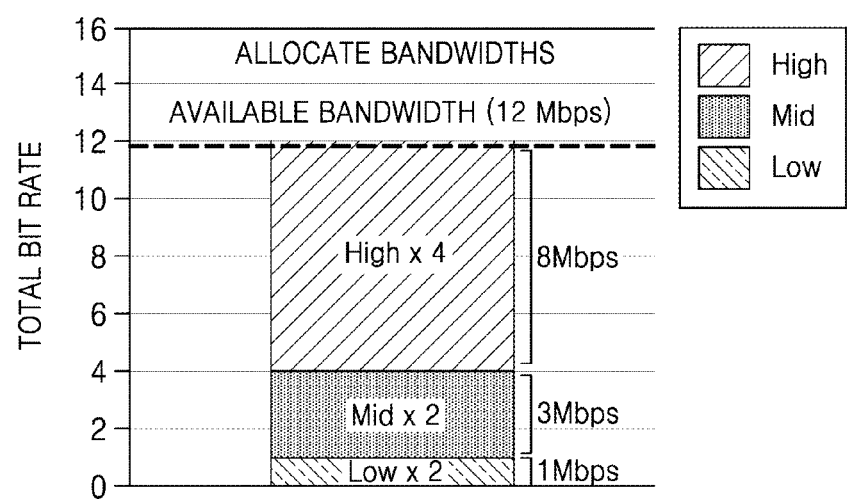

FIGS. 7A and 7B are diagrams of an image 700 configured in a differential quality for each region according to an embodiment.

An entire image of FIG. 7A is configured as a combination of divided regions 702.

Referring to FIGS. 7A and 7B, an example in which each region divided from an image is encoded with a predetermined quality based on an available network bandwidth is illustrated. According to the example shown in FIGS. 7A and 7B, it is determined that the available network bandwidth is 12 Mbps. At this time, the available network bandwidth is differentially allocated to the divided regions 702. A bandwidth may be allocated considering the importance of each of the regions 702 such that deterioration in image quality experienced by a viewer may be minimized. For example, the higher the complexity of each of the regions 702, the higher the importance. Therefore, a region with high importance for improving the image quality may be encoded with high quality.

Unlike the case where the entire region is configured in a single quality, when the image quality for each region is differently configured, there may be at least one quality configuration for each region. A bit rate according to the quality for each region is predefined as shown in Table 1 below.

TABLE 1

|  | High quality (High) | Medium quality (Mid) | Low quality (Low) |
| --- | --- | --- | --- |
| Entire region | 16 Mpbs | 12 Mpbs | 4 Mpbs |
| Individual regions | 2 Mpbs | 1.5 Mpbs | 0.5 Mpbs |

Referring to an example of Table 1, when an entire image may be encoded with the high quality of 16 Mbps, eight divided individual regions may be encoded with the high quality of 2 Mbps. Also, when the entire image may be encoded with the medium quality of 12 Mbps, the eight divided individual regions may be encoded with the medium quality of 1.5 Mbps. Also, when the entire image may be encoded with the low quality of 4 Mbps, the eight divided individual regions may be encoded with the medium quality of 0.5 Mbps. However, criterion for dividing the quality is not limited to the above-described example, but may be variously set according to available resources on a server side, a network side, and a client side. Likewise, in the above embodiment, it is assumed that the region is divided into the eight regions, but the number and the size of the divided regions may vary.

Referring to FIGS. 7A and 7B, regions having high importance are encoded with the high quality H, regions having medium importance are encoded with the medium quality M, and regions having low importance are encoded with low quality L. The sum of bit rates according to the quality for each region does not exceed the available network bandwidth.

In case of streaming 360-degree image data such as a VR image, there are many cases in which complexity differs for each region. When all the regions are configured with a single quality regardless of the complexity, the viewer may feel deterioration in the image quality. Thus, by differentially configuring the quality for each region as described above, it is possible to minimize deterioration of the image quality and simultaneously utilize the available network bandwidth efficiently.

Figure 8:
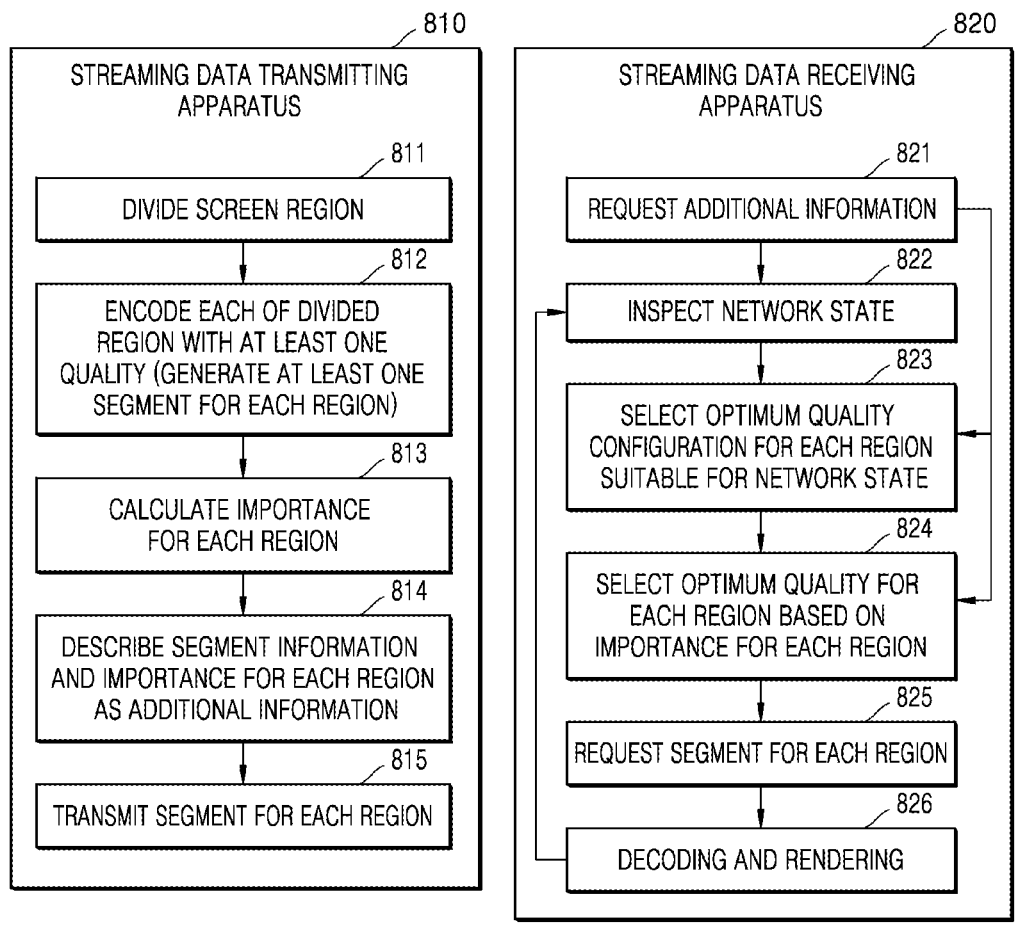
FIG. 8 is a flowchart for explaining a method of streaming content, according to an embodiment.

FIG. 8 is a flowchart for explaining a method of streaming content, according to an embodiment.

A streaming data transmitting apparatus 810 and a streaming data receiving apparatus 820 shown in FIG. 8 may correspond to the server 310 and the client 330 in FIG. 3, respectively.

Referring to FIG. 8, the streaming data transmitting apparatus 810 according to an embodiment divides 811 a predetermined frame of content into a plurality of regions.

The streaming data transmitting apparatus 810 according to an embodiment encodes 812 each of the divided regions with at least one quality for adaptive streaming according to a flexible streaming environment. The streaming data transmitting apparatus 810 may generate at least one segment for each of the divided regions by adjusting factors such as a bit rate, a sampling frequency, resolution, a frame rate, and the like. The generated at least one segment for each region is a data unit of a spatially divided bit stream.

The streaming data transmitting apparatus 810 according to an embodiment calculates 813 the importance for each region. The importance for each region may mean complexity information with respect to a plurality of regions, object state information, information about whether viewing is possible, and the like. Complexity may be data representing relation between pixels by a numerical value, a grade, a degree, and the like and calculated based on various equations for calculating the complexity. An object state may be calculated based on a likelihood that is to be related to the object state determined by comparing a difference in brightness, color, and depth between adjacent pixels in the image with a learned feature, and may be calculated using at least one of a global optimization technique or a local optimization technique. The information about whether viewing is possible may be calculated by obtaining information about a feature of the content itself, a region of interest (ROI), a field of view (FOV), etc. from source media data, a client, an image reproduction device, etc.

The streaming data transmitting apparatus 810 according to an embodiment describes 814 segment information including information about a temporal location of a segment, a spatial location, quality, a URL, a size, and the like and information about the calculated importance for each region as additional information.

The streaming data transmitting apparatus 810 according to an embodiment transmits 815 the segment for each region according to a request from the streaming data receiving apparatus 820.

Referring to FIG. 8, the streaming data receiving apparatus 820 according to an embodiment requests 821 the streaming data transmitting apparatus 810 for additional information including the segment information and the information about the importance for each region.

The streaming data receiving apparatus 820 according to an embodiment inspects 822 a network state. The streaming data receiving apparatus 820 may determine an available network bandwidth by measuring and predicting the network state for streaming. The streaming data receiving apparatus 820 may measure a bandwidth of a network connected to the streaming data transmitting apparatus 810 at a predetermined time interval. When the bandwidth of the network changes quickly, the bandwidth may be measured by setting the time interval to be short, and when the bandwidth of the network changes slowly, the bandwidth may be measured by setting the time interval to be long.

The streaming data receiving apparatus 820 according to an embodiment generates 823 a quality configuration candidate group for each region suitable for the network state. The quality configuration candidate group for each region may refer to various combinations of quality (e.g., a bit rate) that may be allocated for a plurality of regions to enable seamless media reproduction based on the available network bandwidth. As the available network bandwidth increases, the number of quality configuration candidate groups for each region increases, and the number of quality configuration candidate groups for each region increases as types of quality to be encoded varies. The streaming data receiving apparatus 820 may generate the quality configuration candidate group for each region based on the network state and the segment information included in the additional information received from the streaming data transmitting apparatus 810.

The streaming data receiving apparatus 820 according to an embodiment selects 824 an optimum quality for each region based on the importance for each region. The importance for each region may be information included in the additional information received from the streaming data transmitting apparatus 810. For example, high quality (a high bandwidth) may be allocated for a high importance region, and low quality (a low bandwidth) may be allocated for a low importance region.

The streaming data receiving apparatus 820 according to an embodiment requests 825 the streaming data transmitting apparatus 810 for the segment for each region. The segment for each region requested by the streaming data receiving apparatus 820 refers to a segment for each region corresponding to the optimum quality for each region selected by the streaming data receiving apparatus 820 among at least one segment for each region owned by the streaming data transmitting apparatus 810.

The streaming data receiving apparatus 820 according to an embodiment decodes the segment for each region received from the streaming data transmitting apparatus 810 to generate a reconstruction image for each region, and merges and renders 826 the generated reconstruction image for each region.

Figure 9:
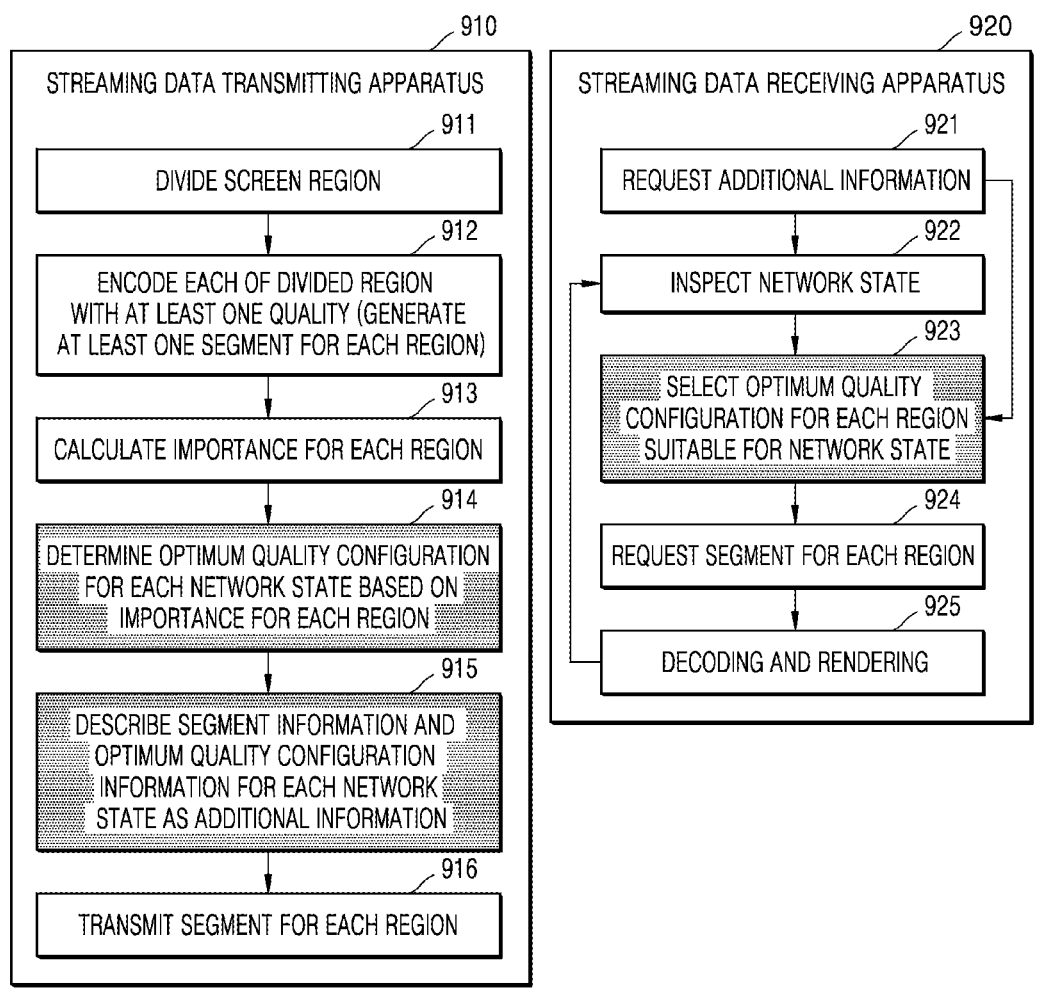
FIG. 9 is a flowchart for explaining a method of streaming content, according to another embodiment.

FIG. 9 is a flowchart for explaining a method of streaming content, according to another embodiment.

A streaming data transmitting apparatus 910 and a streaming data receiving apparatus 920 shown in FIG. 9 may correspond to the server 310 and the client 330 in FIG. 3, respectively.

Referring to FIG. 9, the streaming data transmitting apparatus 910 according to an embodiment divides 911 a predetermined frame of content into a plurality of regions.

The streaming data transmitting apparatus 910 according to an embodiment encodes 912 each of the divided regions with at least one quality for adaptive streaming according to a flexible streaming environment. The streaming data transmitting apparatus 910 may generate at least one segment for each of the divided regions by adjusting factors such as a bit rate, a sampling frequency, resolution, a frame rate, and the like.

The streaming data transmitting apparatus 910 according to an embodiment calculates 913 importance for each region. The importance for each region may mean complexity information with respect to the plurality of regions, object state information, information about whether viewing is possible, and the like.

The streaming data transmitting apparatus 910 according to an embodiment determines 914 an optimum quality configuration for each network state based on the importance for each region. The optimum quality configuration for each network state represents relation between available bandwidths of various sizes and optimum quality configurations for respective regions corresponding thereto.

When the network state is measured and predicted by the streaming data receiving apparatus 920 rather than the streaming data transmitting apparatus 910, then the streaming data transmitting apparatus 910 may not predict a flexible available network bandwidth in advance. Instead, the streaming data transmitting apparatus 910 may generate the optimum quality configuration for each network state in advance as a kind of reference table such that the streaming data receiving apparatus 920 does not need to determine the optimum quality configuration according to the network state in real time. In other words, the streaming data receiving apparatus 920 may omit an operation of generating a quality configuration candidates group for each region, unlike the embodiment of FIG. 8. In other words, the streaming data receiving apparatus 920 only selects the optimum quality for each region corresponding to the measured network state, using a reference table generated by the streaming data transmitting apparatus 910. Accordingly, the resource use of the streaming data receiving apparatus 920 may be minimized.

The streaming data transmitting apparatus 910 according to an embodiment describes 915 segment information including information on a temporal location of a segment, a spatial location, a quality, a URL, a size, and the like, and information about the optimum quality configuration for each network state as additional information.

The streaming data transmitting apparatus 910 according to an embodiment transmits 916 the segment for each region according to a request from the streaming data receiving apparatus 920.

Referring to FIG. 9, the streaming data receiving apparatus 920 according to an embodiment requests 921 the streaming data transmitting apparatus 910 for the additional information including the segment information and the information about the optimum quality configuration for each network state.

The streaming data receiving apparatus 920 according to an embodiment inspects 922 the network state. The streaming data receiving apparatus 920 may determine the available network bandwidth by measuring and predicting the network state for streaming.

The streaming data receiving apparatus 920 according to an embodiment selects 923 an optimum quality configuration for each region suitable for the network state. The streaming data receiving apparatus 920 may select the optimum quality for each region corresponding to the available network bandwidth by using the reference table (i.e., the optimum quality configuration information for each network state) generated by the streaming data transmitting apparatus 910. The streaming data receiving apparatus 920 may use the segment information included in the additional information received from the streaming data transmitting apparatus 910 in selecting the optimum quality configuration for each region suitable for the network state.

The streaming data receiving apparatus 920 according to an embodiment requests 924 the streaming data transmitting apparatus 910 for the segment for each region. The segment for each region requested by the streaming data receiving apparatus 920 refers to a segment for each region corresponding to the optimum quality for each region selected by the streaming data receiving apparatus 920 from among at least one segment for each region owned by the streaming data transmitting apparatus 910.

The streaming data receiving apparatus 920 according to an embodiment decodes the segment for each region received from the streaming data transmitting apparatus 910 to generate a reconstruction image for each region, and merges and renders 925 the generated reconstruction image for each region.

Figure 10:
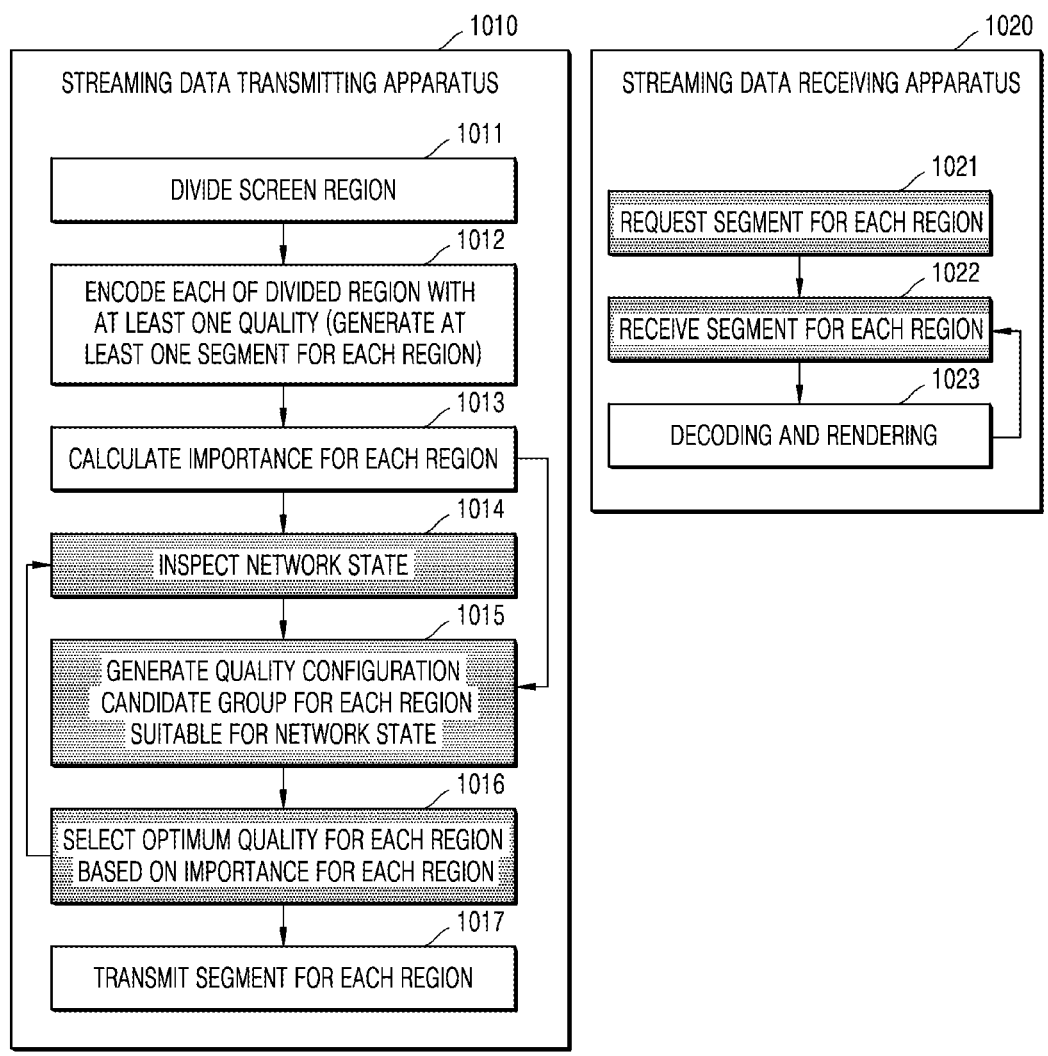
FIG. 10 is a flowchart for explaining a method of streaming content, according to another embodiment.

FIG. 10 is a flowchart for explaining a method of streaming content, according to another embodiment.

A streaming data transmitting apparatus 1010 and a streaming data receiving apparatus 1020 shown in FIG. 10 may correspond to the server 310 and the client 330 in FIG. 3, respectively.

Referring to FIG. 10, the streaming data transmitting apparatus 1010 according to an embodiment divides 1011 a predetermined frame of content into a plurality of regions.

The streaming data transmitting apparatus 1010 according to an embodiment encodes 1012 each of the divided regions with at least one quality for adaptive streaming according to a flexible streaming environment. The streaming data transmitting apparatus 1010 may generate at least one segment for each of the divided regions by adjusting factors such as a bit rate, a sampling frequency, resolution, a frame rate, and the like.

The streaming data transmitting apparatus 1010 according to an embodiment calculates 1013 the importance for each region. The importance for each region may mean complexity information with respect to the plurality of regions, object state information, information about whether viewing is possible, and the like.

The streaming data transmitting apparatus 1010 according to an embodiment inspects 1014 a network state. The streaming data transmitting apparatus 1010 may determine an available network bandwidth by measuring and predicting the network state for streaming.

The streaming data transmitting apparatus 1010 according to an embodiment generates 1015 a quality configuration candidate group for each region suitable for the network state. Unlike the embodiment of FIG. 8 or 9, the streaming data transmitting apparatus 1010 generates the quality configuration candidate group for each region such that the resource use of the streaming data receiving apparatus 1020 may be minimized.

The streaming data transmitting apparatus 1010 according to an embodiment selects 1016 an optimum quality for each region based on the importance of each region. Unlike the embodiment shown in FIG. 8 or 9, because the streaming data transmitting apparatus 1010 performs network state inspection, generation of the candidate quality group for each region, and selection of the optimum quality for each region, the streaming data receiving apparatus 1020 does not need to determine the optimum quality for each region. Accordingly, the streaming data transmitting apparatus 1010 does not need to separately generate and transmit the additional information for determining the optimum quality for each region.

The streaming data transmitting apparatus 1010 according to an embodiment transmits 1017 a segment for each region according to a request from the streaming data receiving apparatus 1020.

Referring to FIG. 10, the streaming data receiving apparatus 1020 according to an embodiment requests 1021 the streaming data transmitting apparatus 1010 for the segment for each region. The segment for each region requested by the streaming data receiving apparatus 1020 refers to a segment for each region corresponding to the optimum quality for each region selected by the streaming data transmitting apparatus 1010 among at least one segment for each region owned by the streaming data transmitting apparatus 1010.

The streaming data receiving apparatus 1020 according to an embodiment receives 1022 the segment for each region from the streaming data transmitting apparatus 1010.

The streaming data receiving apparatus 1020 according to an embodiment decodes the segment for each region received from the streaming data transmitting apparatus 1010 to generate a reconstruction image for each region, and merges and renders 1023 the generated reconstruction image for each region.

Figure 11:
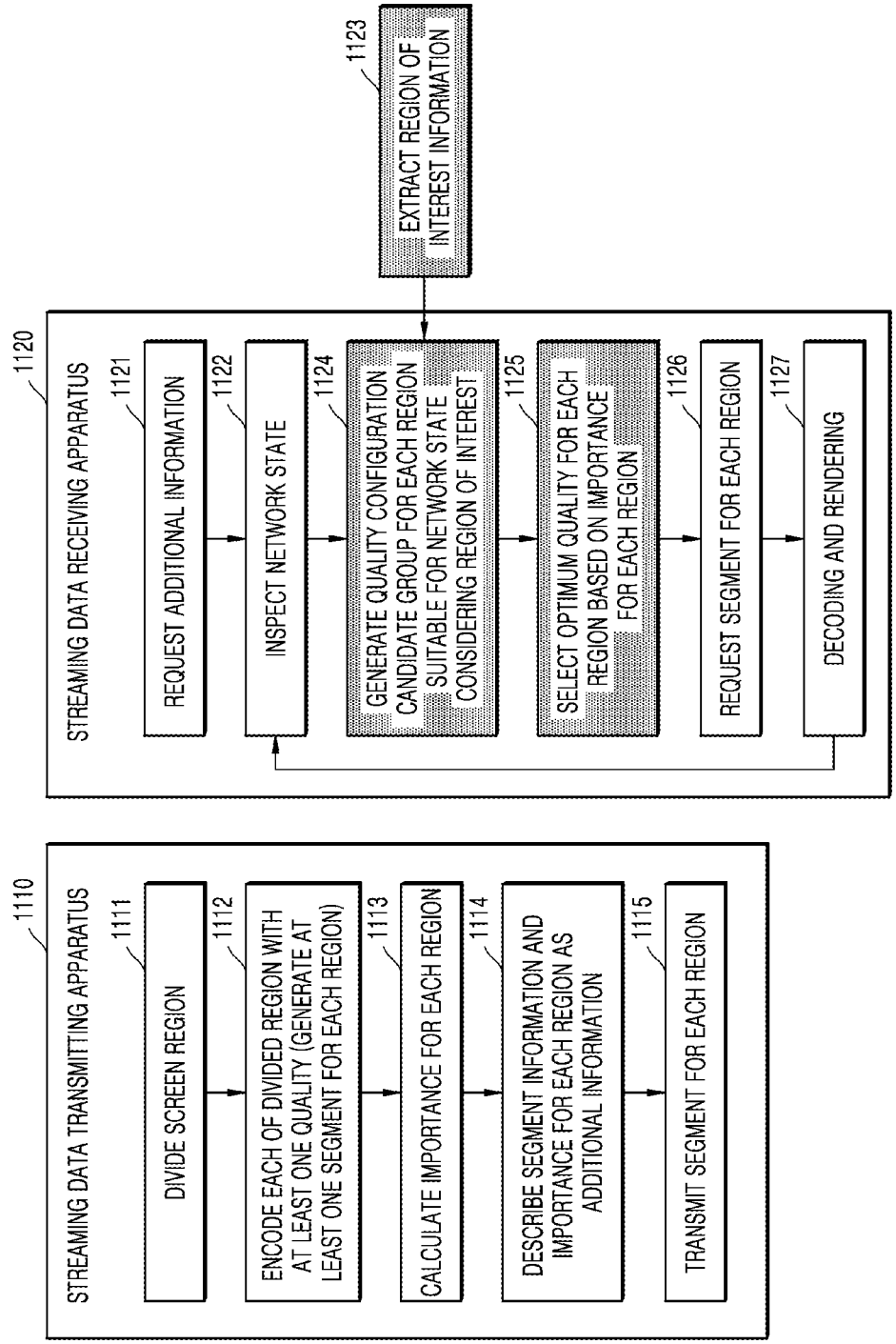
FIG. 11 is a flowchart for explaining a method of streaming content based on a region of interest according to an embodiment.

FIG. 11 is a flowchart for explaining a method of streaming content based on a region of interest, according to an embodiment.

A streaming data transmitting apparatus 1110 and a streaming data receiving apparatus 1120 shown in FIG. 11 may correspond to the server 310 and the client 330 in FIG. 3, respectively.

Referring to FIG. 11, the streaming data transmitting apparatus 1110 according to an embodiment divides 1111 a predetermined frame of content into a plurality of regions.

The streaming data transmitting apparatus 1110 according to an embodiment encodes 1112 each of the divided regions with at least one quality for adaptive streaming according to a flexible streaming environment. The streaming data transmitting apparatus 1110 may generate at least one segment for each of the divided regions by adjusting factors such as a bit rate, a sampling frequency, resolution, a frame rate, etc.

The streaming data transmitting apparatus 1110 according to an embodiment calculates 1113 importance for each region. The importance for each region may mean complexity information with respect to the plurality of regions, object state information, information about whether viewing is possible, and the like.

The streaming data transmitting apparatus 1110 according to an embodiment describes 1114 segment information including information about a temporal location of a segment, a spatial location, quality, a URL, size, and the like and information about the calculated importance for each region as additional information.

The streaming data transmitting apparatus 1110 according to an embodiment transmits 1115 a segment for each region according to a request from the streaming data receiving apparatus 1120.

Referring to FIG. 11, the streaming data receiving apparatus 1120 according to an embodiment requests 1121 the streaming data transmitting apparatus 1110 for the additional information including the segment information and the information about the importance for each region.

The streaming data receiving apparatus 1120 according to an embodiment inspects 1122 a network state. The streaming data receiving apparatus 1120 may determine an available network bandwidth by measuring and predicting the network state for streaming.

The streaming data receiving apparatus 1120 according to an embodiment extracts 1123 region of interest information. The region of interest information may be obtained from the characteristics of content itself. The region of interest information may also include information about a region of interest (ROI), a field of view (FOV), etc. obtained from a client, a video reproducing apparatus, and the like.

The streaming data receiving apparatus 1120 according to an embodiment generates 1124 a quality configuration candidate group for each region suitable for the network state considering the region of interest.

The streaming data receiving apparatus 1120 according to an embodiment selects 1125 optimum quality for each region based on the importance for each region. The importance for each region may be information included in the additional information received from the streaming data transmitting apparatus 1110. For example, high quality (a high bandwidth) may be allocated for a high importance region, and low quality (a low bandwidth) may be allocated for a low importance region. Also, a region corresponding to the region of interest is weighted and assigned with the high quality, and a region not corresponding to the region of interest may be assigned with the low quality.

The streaming data receiving apparatus 1120 according to an embodiment requests 1126 the streaming data transmitting apparatus 1110 for the segment for each region. The segment for each region requested by the streaming data receiving apparatus 1120 refers to a segment for each region corresponding to the optimum quality for each region selected by the streaming data receiving apparatus 1120 among at least one segment for each region owned by the streaming data transmitting apparatus 1110.

The streaming data receiving apparatus 1120 according to an embodiment decodes the segment for each region received from the streaming data transmitting apparatus 1110 to generate a reconstruction image for each region, and merges and renders 1127 the generated reconstruction image for each region.

Figure 12:
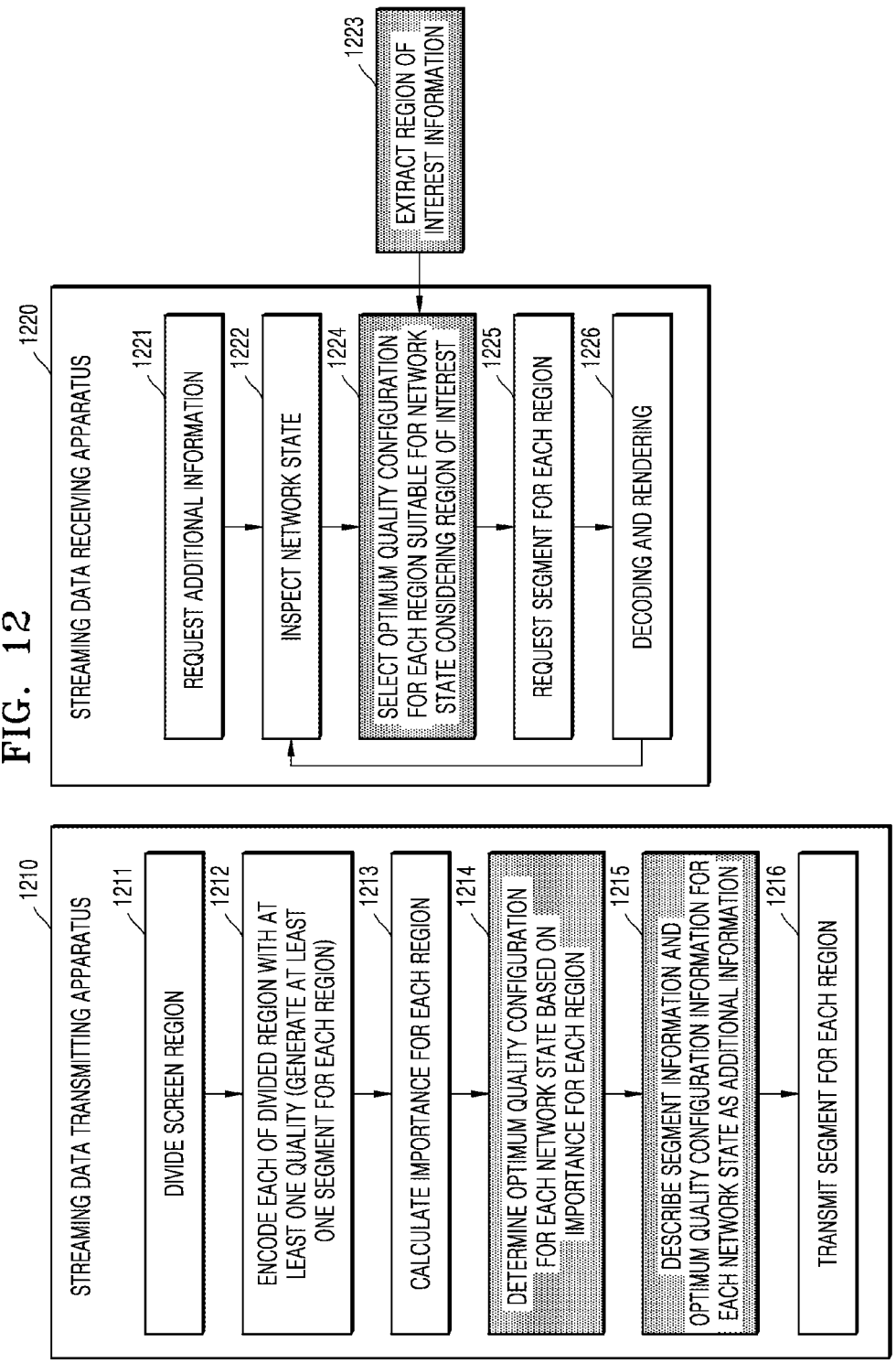
FIG. 12 is a flowchart for explaining a method of streaming content based on a region of interest, according to another embodiment.

FIG. 12 is a flowchart for explaining a method of streaming content based on a region of interest, according to another embodiment.

A streaming data transmitting apparatus 1210 and a streaming data receiving apparatus 1220 shown in FIG. 12 may correspond to the server 310 and the client 330 in FIG. 3, respectively.

Referring to FIG. 12, the streaming data transmitting apparatus 1210 according to an embodiment divides 1211 a predetermined frame of content into a plurality of regions.

The streaming data transmitting apparatus 1210 according to an embodiment encodes 1212 each of the divided regions with at least one quality for adaptive streaming according to a flexible streaming environment. The streaming data transmitting apparatus 1210 may generate at least one segment for each of the divided regions by adjusting factors such as a bit rate, a sampling frequency, resolution, a frame rate, and the like.

The streaming data transmitting apparatus 1210 according to an embodiment calculates 1213 the importance for each region. The importance for each region may mean complexity information with respect to the plurality of regions, object state information, information about whether viewing is possible, and the like.

The streaming data transmitting apparatus 1210 according to an embodiment determines 1214 an optimum quality configuration for each network state based on the importance for each region. The optimum quality configuration for each network state represents relation between available bandwidths of various sizes and optimum quality configurations for respective regions corresponding thereto.

The streaming data transmitting apparatus 1210 according to an embodiment describes 1215 segment information including information about a temporal location of a segment, a spatial location, a quality, a URL, a size, and the like and information about the optimum quality configuration for each network state as additional information.

The streaming data transmitting apparatus 1210 according to an embodiment transmits 1216 the segment for each region according to a request from the streaming data receiving apparatus 1220.

Referring to FIG. 12, the streaming data receiving apparatus 1220 according to an embodiment requests 1221 the streaming data transmitting apparatus 1210 for the additional information including the segment information and the information about the optimum quality configuration for each network state.

The streaming data receiving apparatus 1220 according to an embodiment inspects 1222 the network state. The streaming data receiving apparatus 1220 may determine an available network bandwidth by measuring and predicting the network state for streaming.

The streaming data receiving apparatus 1220 according to an embodiment extracts 1223 region of interest information.

The streaming data receiving apparatus 1220 according to an embodiment selects 1224 an optimum quality configuration for each region suitable for the network state considering the region of interest. The streaming data receiving apparatus 1220 may select the optimum quality for each region corresponding to the available network bandwidth by using a reference table (i.e., optimum quality configuration information for each network state) generated by the streaming data transmitting apparatus 1210. The streaming data receiving apparatus 1220 may use the segment information included in the additional information received from the streaming data transmitting apparatus 1210 in selecting the optimum quality configuration for each region suitable for the network state.

The streaming data receiving apparatus 1220 according to an embodiment requests 1225 the streaming data transmitting apparatus 1210 for a segment for each region. The segment for each region requested by the streaming data receiving apparatus 1220 refers to a segment for each region corresponding to the optimum quality for each region selected by the streaming data receiving apparatus 1220 from among at least one segment for each region owned by the streaming data transmitting apparatus 1210.

The streaming data receiving apparatus 1220 according to an embodiment decodes the segment for each region received from the streaming data transmitting apparatus 1210 to generate a reconstruction image for each region and merges and renders 1226 the generated reconstruction image for each region.

Figure 13:
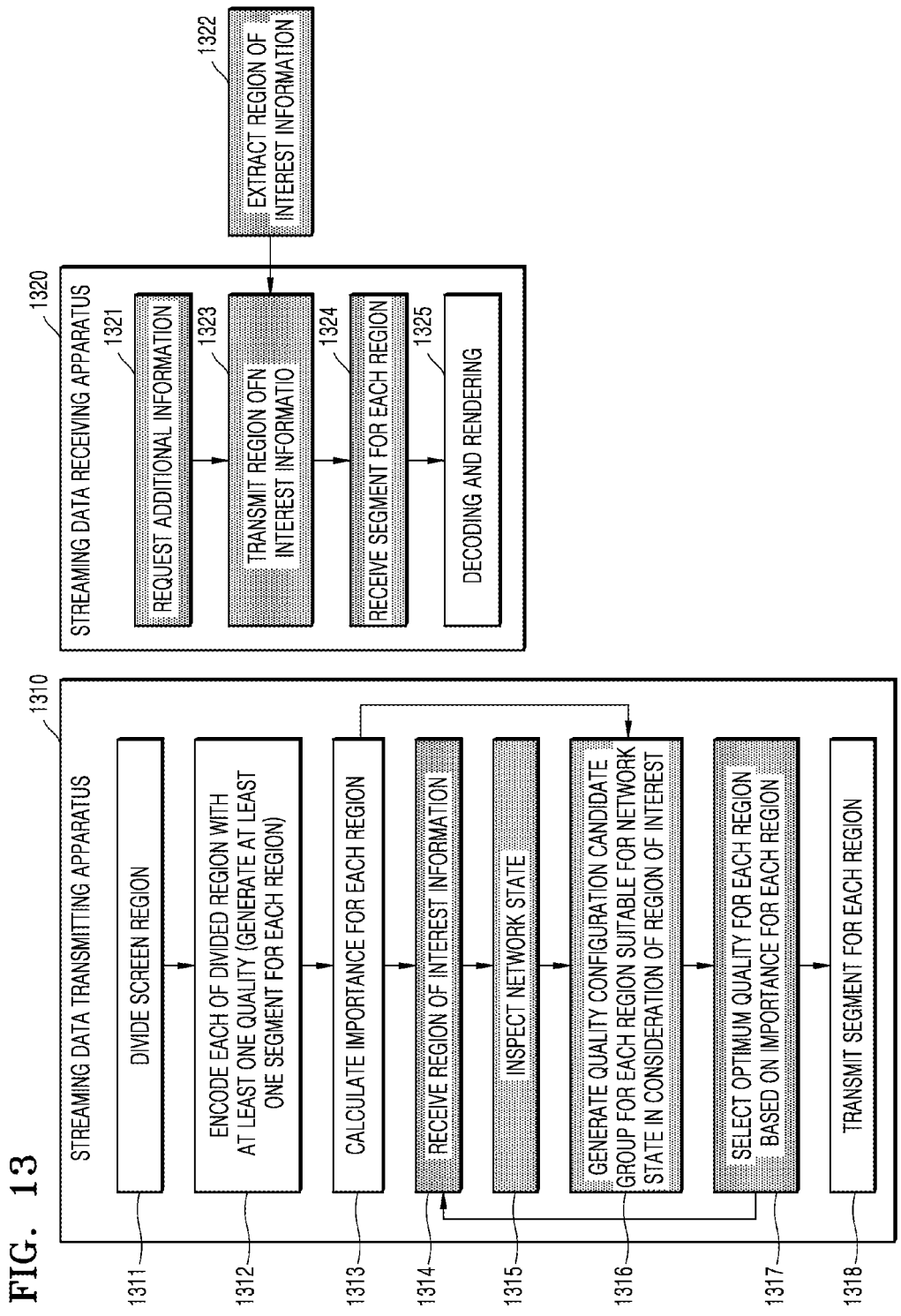
FIG. 13 is a flowchart for explaining a method of streaming content based on a region of interest, according to another embodiment.

FIG. 13 is a flowchart for explaining a method of streaming content based on a region of interest, according to another embodiment.

A streaming data transmitting apparatus 1310 and a streaming data receiving apparatus 1320 shown in FIG. 13 may correspond to the server 310 and the client 330 in FIG. 3, respectively.

Referring to FIG. 13, the streaming data transmitting apparatus 1310 according to an embodiment divides 1311 a predetermined frame of content into a plurality of regions.

The streaming data transmitting apparatus 1310 according to an embodiment encodes 1312 each of the divided regions with at least one quality for adaptive streaming according to a flexible streaming environment. The streaming data transmitting apparatus 1310 may generate at least one segment for each of the divided regions by adjusting factors such as a bit rate, a sampling frequency, resolution, a frame rate, and the like.

The streaming data transmitting apparatus 1310 according to an embodiment calculates 1313 the importance for each region. The importance for each region may mean complexity information with respect to the plurality of regions, object state information, information about whether viewing is possible, and the like.

The streaming data transmitting apparatus 1310 according to an embodiment receives 1314 region of interest information from the streaming data receiving apparatus 1320.

The streaming data transmitting apparatus 1310 according to an embodiment inspects 1315 a network state. The streaming data transmitting apparatus 1310 may determine an available network bandwidth by measuring and predicting the network state for streaming.

The streaming data transmitting apparatus 1310 according to an embodiment generates 1316 a quality configuration candidate group for each region considering the region of interest.

The streaming data transmitting apparatus 1310 according to an embodiment selects 1317 an optimum quality for each region based on the importance for each region. The streaming data receiving apparatus 1320 does not need to determine the optimum quality for each region because the streaming data transmitting apparatus 1310 performs inspection of the network state, generation of the quality configuration candidate for each region, and selection of the optimum quality for each region. Therefore, the streaming data transmitting apparatus 1310 does not need to separately generate and transmit additional information for determining the optimum quality for each region.

The streaming data transmitting apparatus 1310 according to an embodiment transmits 1318 a segment for each region according to a request from the streaming data receiving apparatus 1320.

Referring to FIG. 13, the streaming data receiving apparatus 1320 according to an embodiment requests 1321 the streaming data transmitting apparatus 1310 for the segment for each region. The segment for each region requested by the streaming data receiving apparatus 1320 refers to a segment for each region corresponding to the optimum quality for each region selected by the streaming data transmitting apparatus 1310 among at least one segment for each region owned by the streaming data transmitting apparatus 1310.

The streaming data receiving apparatus 1320 according to an embodiment extracts 1322 region of interest information.

The streaming data receiving apparatus 1320 according to an embodiment transmits 1323 the region of interest information to the streaming data transmitting apparatus 1310.

The streaming data receiving apparatus 1320 according to an embodiment receives 1324 the segment for each region from the streaming data transmitting apparatus 1310.

The streaming data receiving apparatus 1320 according to an embodiment decodes the segment for each region received from the streaming data transmitting apparatus 1310 to generate a reconstruction image for each region, and merges and renders 1325 the generated reconstruction image for each region.

Figure 14:
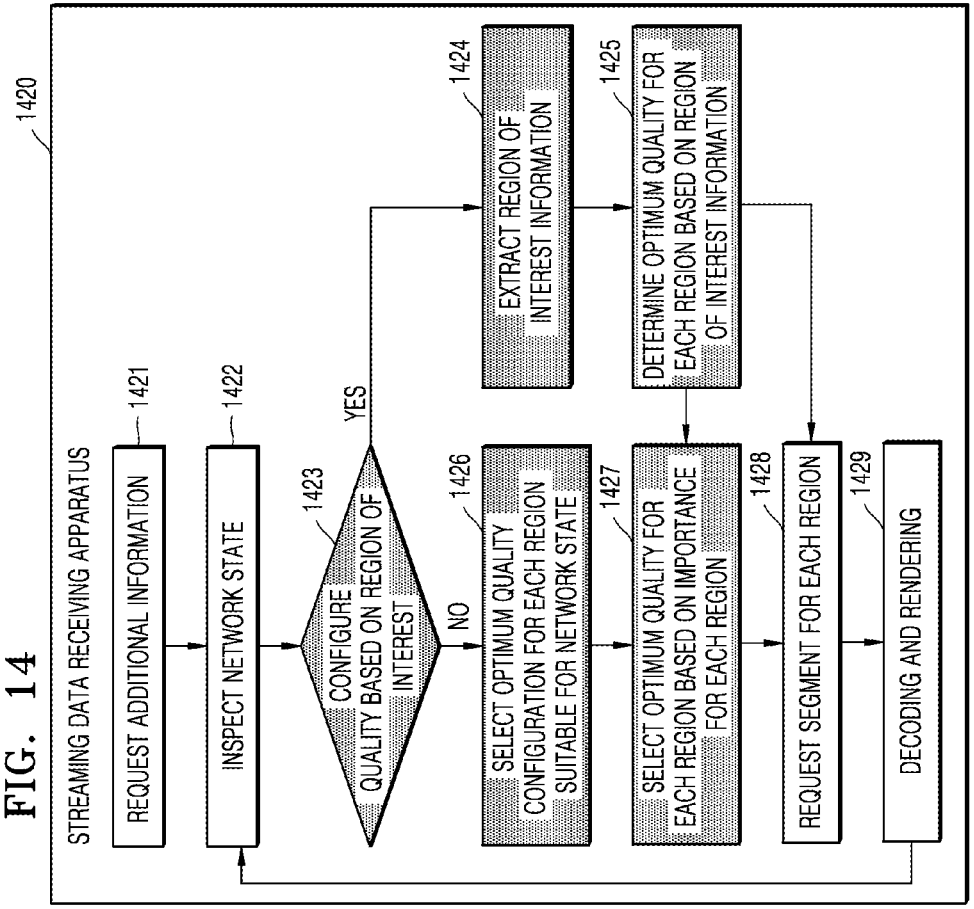
FIG. 14 is a flowchart for explaining a streaming method based on a determination as to whether to use a region of interest, according to an embodiment.
Figure 14:
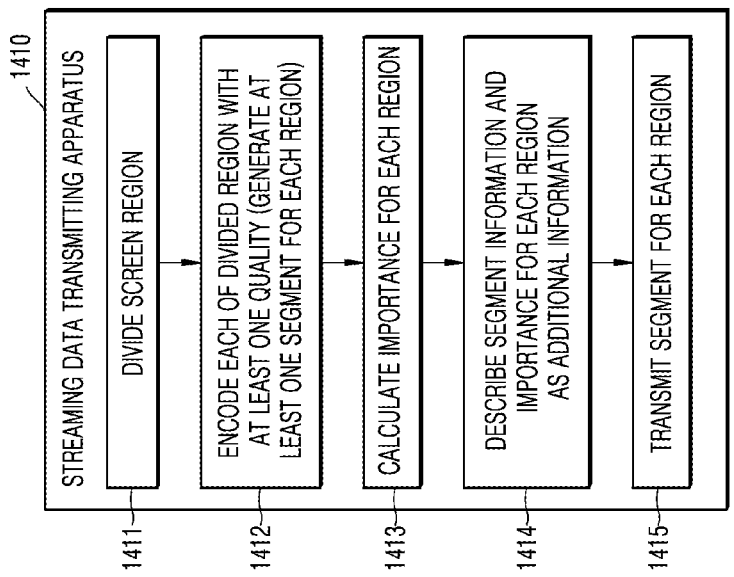

FIG. 14 is a flowchart for explaining a streaming method based on a determination as to whether to use a region of interest according to an embodiment.

A streaming data transmitting apparatus 1410 and a streaming data receiving apparatus 1420 shown in FIG. 14 may correspond to the server 310 and the client 330 in FIG. 3, respectively.

Referring to FIG. 14, the streaming data transmitting apparatus 1410 according to an embodiment divides 1411 a predetermined frame of content into a plurality of regions.

The streaming data transmitting apparatus 1410 according to an embodiment encodes 1412 each of the divided regions with at least one quality for adaptive streaming according to a flexible streaming environment. The streaming data transmitting apparatus 1410 may generate at least one segment for each of the divided regions by adjusting factors such as a bit rate, a sampling frequency, resolution, a frame rate, and the like.

The streaming data transmitting apparatus 1410 according to an embodiment calculates 1413 the importance for each region. The importance for each region may mean complexity information with respect to the plurality of regions, object state information, information about whether viewing is possible, and the like.

The streaming data transmitting apparatus 1410 according to an embodiment describes 1414 segment information including information about a temporal location of a segment, a spatial location, a quality, a URL, a size, and the like, and information about the calculated importance for each region as additional information.

The streaming data transmitting apparatus 1410 according to an embodiment transmits 1415 a segment for each region according to a request from the streaming data receiving apparatus 1420.

Referring to FIG. 14, the streaming data receiving apparatus 1420 according to an embodiment requests 1421 the streaming data transmitting apparatus 1410 for the additional information including the segment information and the information about the calculated importance for each region.

The streaming data receiving apparatus 1420 according to an embodiment inspects 1422 a network state. The streaming data receiving apparatus 1420 may determine an available network bandwidth by measuring and predicting the network state for streaming.

The streaming data receiving apparatus 1420 according to an embodiment determines 1423 whether to configure the quality based on the region of interest. Determination of whether to configure the quality based on the region of interest may be made by a user or automatically according to the characteristics of content itself.

The streaming data receiving apparatus 1420 according to an embodiment extracts 1424 region of interest information when configuring the quality based on the region of interest and determines 1425 an optimum quality for each region based on the extracted region of interest information.

The streaming data receiving apparatus 1420 according to an embodiment generates 1426 a quality configuration candidate group for each region suitable for the network state when not configuring the quality based on the region of interest, and selects 1427 the optimum quality for each region based on the importance for each region.

The streaming data receiving apparatus 1420 according to an embodiment requests 1428 the streaming data transmitting apparatus 1410 for the segment for each region.

The streaming data receiving apparatus 1420 according to an embodiment decodes the segment for each region received from the streaming data transmitting apparatus 1410 to generate a reconstruction image for each region and merges and renders 1429 the generated reconstruction image for each region.

Figure 15:
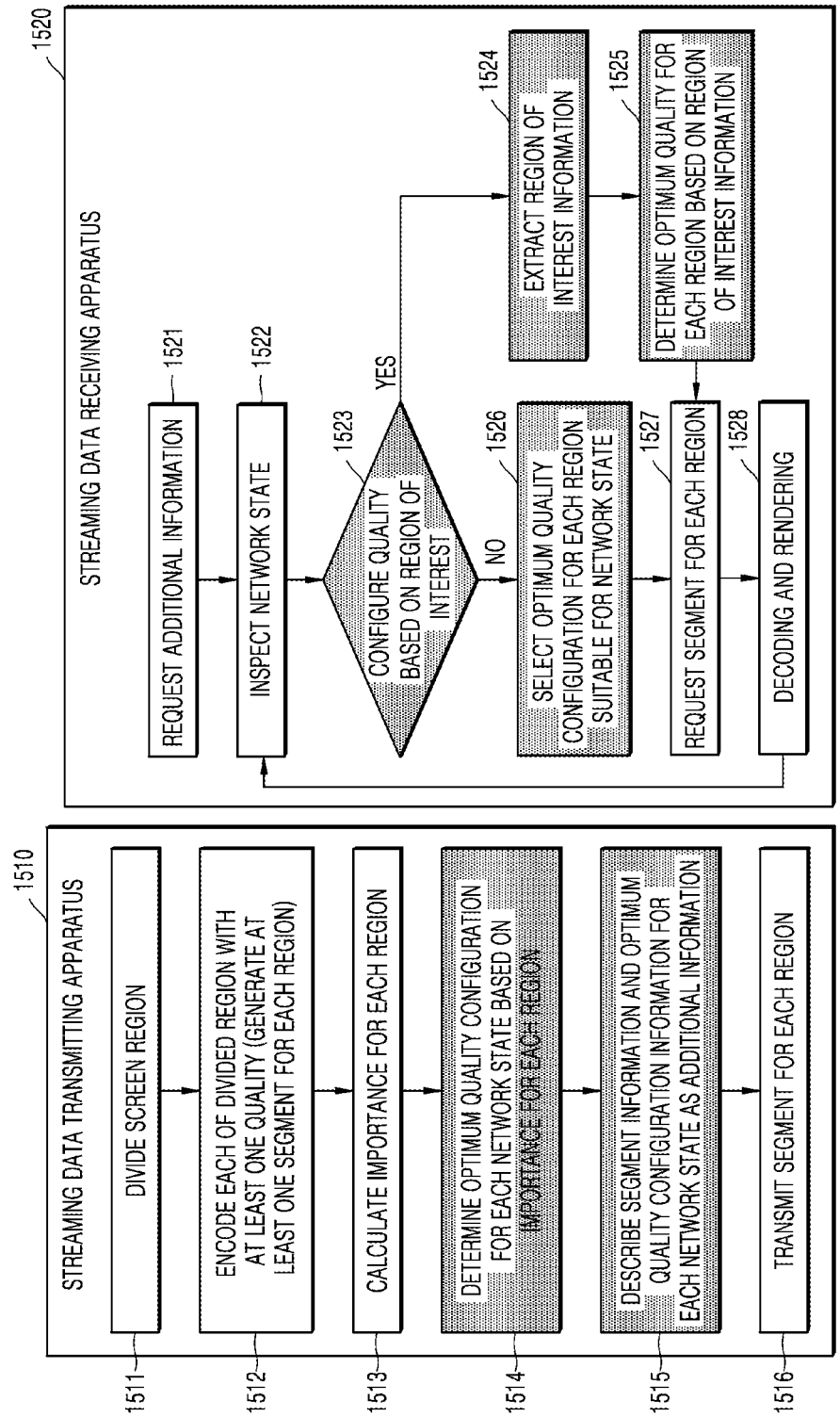
FIG. 15 is a flowchart for explaining a streaming method based on a determination as to whether to use a region of interest, according to another embodiment.

FIG. 15 is a flowchart for explaining a streaming method based on a determination as to whether to use a region of interest, according to another embodiment.

A streaming data transmitting apparatus 1510 and a streaming data receiving apparatus 1520 shown in FIG. 15 may correspond to the server 310 and the client 330 in FIG. 3, respectively.

Referring to FIG. 15, the streaming data transmitting apparatus 1510 according to an embodiment divides 1511 a predetermined frame of content into a plurality of regions.

The streaming data transmitting apparatus 1510 according to an embodiment encodes 1512 each of the divided regions with at least one quality for adaptive streaming according to a flexible streaming environment. The streaming data transmitting apparatus 1510 may generate at least one segment for each of the divided regions by adjusting factors such as a bit rate, a sampling frequency, resolution, a frame rate, and the like.

The streaming data transmitting apparatus 1510 according to an embodiment calculates 1513 the importance for each region. The importance for each region may mean complexity information with respect to the plurality of regions, object state information, information about whether viewing is possible, and the like.

The streaming data transmitting apparatus 1510 according to an embodiment determines 1514 an optimum quality configuration for each network state based on the importance for each region. The optimum quality configuration for each network state represents relation between available bandwidths of various sizes and the optimum quality configurations for respective regions corresponding thereto.

The streaming data transmitting apparatus 1510 according to an embodiment describes 1515 segment information including information about a temporal location of a segment, a spatial location, a quality, a URL, a size, and the like, and information about the optimum quality configuration for each network state as additional information.

The streaming data transmitting apparatus 1510 according to an embodiment transmits 1516 a segment for each region according to a request from the streaming data receiving apparatus 1520.

Referring to FIG. 15, the streaming data receiving apparatus 1520 according to an embodiment requests 1521 the streaming data transmitting apparatus 1510 for the additional information including the segment information and the information about the optimum quality configuration for each network state.

The streaming data receiving apparatus 1520 according to an embodiment inspects 1522 a network state. The streaming data receiving apparatus 1520 may determine an available network bandwidth by measuring and predicting the network state for streaming.

The streaming data receiving apparatus 1520 according to an embodiment determines 1523 whether to configure the quality based on the region of interest. Determination as to whether to configure the quality based on the region of interest may be made by a user or automatically according to the characteristics of content itself.

The streaming data receiving apparatus 1520 according to an embodiment extracts 1524 region of interest information when configuring the quality based on the region of interest, and determines 1525 the optimum quality for each region based on the extracted region of interest information.

The streaming data receiving apparatus 1520 according to an embodiment selects 1526 the optimum quality for each region suitable for the network state when not configuring the quality based on the region of interest.

The streaming data receiving apparatus 1520 according to an embodiment requests 1527 the streaming data transmitting apparatus 1510 for the segment for each region.

The streaming data receiving apparatus 1520 according to an embodiment decodes the segment for each region received from the streaming data transmitting apparatus 1510 to generate a reconstruction image for each region and merges and renders 1528 the generated reconstruction image for each region.

Figure 16:
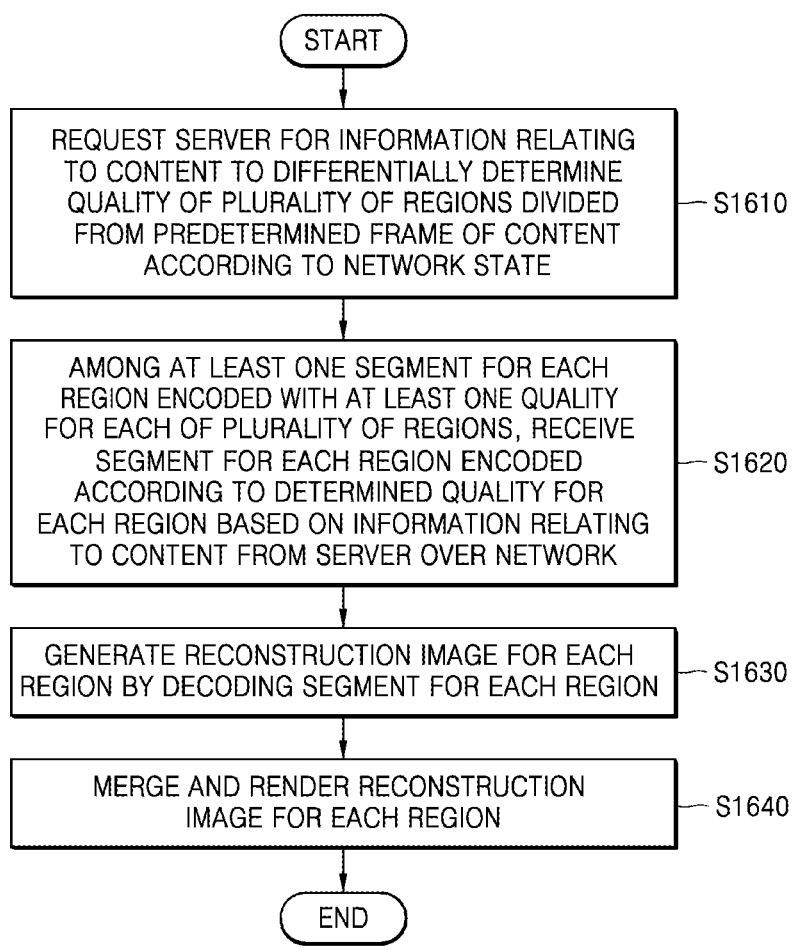
FIG. 16 illustrates a flowchart for explaining a method of receiving streaming data, according to an embodiment.

FIG. 16 illustrates a flowchart for explaining a method of receiving streaming data, according to an embodiment.

In operation S1610, information relating to content is requested from a server in order to differentially determine quality of a plurality of regions divided from a predetermined frame of the content according to a network state.

In operation S1620, among at least one segment for each region encoded with at least one quality for each of the plurality of regions, a segment for each region encoded according to the determined quality for each region based on the information relating to the content is received from the server over a network.

In operation S1630, the segment for each region is decoded to generate a reconstruction image for each region.

In operation S1640, the reconstruction image for each region is merged and rendered.

Figure 17:
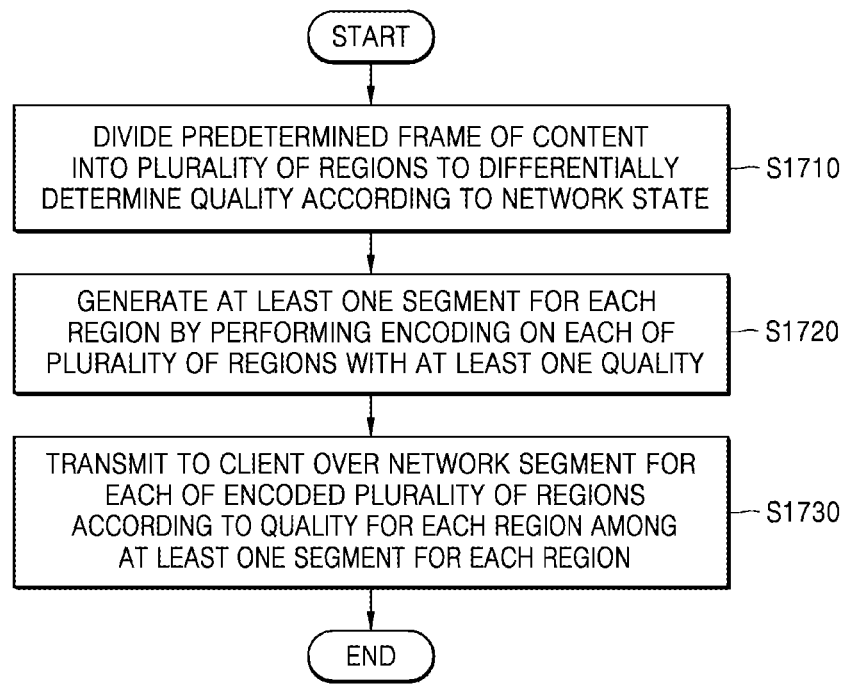
FIG. 17 illustrates a flowchart for explaining a method of transmitting streaming data, according to an embodiment.

FIG. 17 illustrates a flowchart for explaining a method of transmitting streaming data, according to an embodiment.

In operation S1710, a predetermined frame of content is divided into a plurality of regions in order to differentially determine the quality according to a network state.

In operation S1720, encoding is performed with at least one quality for each of the plurality of regions to generate at least one segment for each region.

In operation S1730, the segment for each region encoded according to the quality for each region among at least one segment for each region is transmitted to a client over a network.

While the present disclosure has been particularly shown and described with reference to embodiments thereof, the disclosure is not limited to the disclosed embodiments and will be apparent to those skilled in the art that various modifications and variations may be made in the present disclosure. Accordingly, the spirit of the present disclosure should be understood only in accordance with the following claims, and all of the equal or equivalent variations will fall within the scope of the present disclosure. Also, the system according to the present disclosure may be embodied as computer-readable code on a computer-readable recording medium.

Also, the computer-readable recording medium includes all kinds of recording apparatuses in which data that may be read by a computer system is stored. Examples of the recording medium include ROM, RAM, CD-ROM, magnetic tape, floppy disk, optical data storage, and the like. The computer-readable recording medium may also be distributed over a networked computer system such that the computer-readable code may be stored and executed in a distributed manner.

The invention claimed is:

1. A method of receiving streaming data by a client, the method comprising:
   requesting, by the client, a server for information relating to content to differentially determine quality of a plurality of regions divided from a predetermined frame of the content and receiving, by the client, the information relating to the content from the server;

inspecting, by the client, a state of a network;
generating, by the client, a quality configuration candidate group for each of the plurality of regions based on the state of the network and the received information relating to the content;
selecting, by the client, a quality for each region of the plurality of regions based on the quality configuration candidate group;
receiving, by the client, from the server over the network, a segment for each region of the plurality of regions selected from among at least one segment for each region of the plurality of regions, the at least one segment being generated by encoding each region of the plurality of regions according to at least one quality for each region of the plurality of regions, and the selected segment being determined based on the information relating to the content and corresponding to the selected quality;
generating, by the client, a reconstruction image for each region of the plurality of regions by decoding the received segment for each region of the plurality of regions; and
merging and rendering, by the client, the reconstruction image for each region of the plurality of regions.

2. The method of claim 1,
wherein the information relating to the content comprises additional information comprising importance information with respect to the plurality of regions and segment information with respect to the at least one segment for each region of the plurality of regions,
wherein the importance information with respect to the plurality of regions comprises at least one of complexity information with respect to the plurality of regions, object state information, and information about whether viewing is possible; and
wherein the segment information comprises at least one of quality information of the at least one segment for each region of the plurality of regions and location information of the at least one segment for each region of the plurality of regions within the predetermined frame.

3. The method of claim 2,
wherein the quality for each region of the plurality of regions is selected from the quality configuration candidate group for each region of the plurality of regions, based on the importance information with respect to the plurality of regions.

4. The method of claim 2, wherein the additional information comprises information indicating a quality of each network state with respect to each of the plurality of regions,
wherein the quality for each region of the plurality of regions is determined based on information indicating the state of the network and a quality for each network state.

5. The method of claim 3, wherein the quality configuration candidate group for each region of the plurality of regions is generated based on the state of the network and extracted region of interest information.

6. The method of claim 4, wherein the quality for each region of the plurality of regions is determined based on the state of the network, information indicating the quality for each network state, and extracted region of interest information.

7. The method of claim 2, further comprising:
determining whether to determine the quality for each region of the plurality of regions based on a region of interest; and when the quality for each region of the plurality of regions is determined based on region of interest information:
extracting the region of interest information; and
determining quality information for each region of the plurality of regions based on the region of interest, or
when the quality for each region of the plurality of regions is not determined based on the region of interest:
generating a quality configuration candidate group for each of the plurality of regions based on the state of the network; and
selecting the quality for each region of the plurality of regions among the quality configuration candidate group for each region of the plurality of regions based on the importance information with respect to the plurality of regions.

8. The method of claim 2, further comprising:
determining whether to determine the quality for each region of the plurality of regions based on a region of interest; and
when the quality for each region of the plurality of regions is determined based on region of interest information:
extracting the region of interest information; and
determining quality information for each region of the plurality of regions based on the region of interest, or
when the quality for each region of the plurality of regions is not determined based on the region of interest:
determining the quality information for each region of the plurality of regions based on quality information for each network state with respect to each of the plurality of regions included in the additional information.

9. The method of claim 1, further comprising transmitting extracted region of interest information to the server,
wherein the quality for each region of the plurality of regions is determined based on the region of interest information.

10. A method of transmitting streaming data by a server, the method comprising:
dividing, by the server, a predetermined frame of content into a plurality of regions to differentially determine quality;
generating, by the server, at least one segment for each region of the plurality of regions by performing encoding on each of the plurality of regions with at least one quality;
receiving, by the server, a request for information relating to the content from a client, generating, by the server, the information relating to the content and transmitting, by the server, the information relating to the content to the client;
inspecting, by the server, a state of a network;
generating, by the server, a quality configuration candidate group for each of the plurality of regions based on the state of the network; and
selecting, by the server, a quality for each region of the plurality of regions from the quality configuration candidate group for each region of the plurality of regions based on the information relating to the content;
receiving, by the server, a request for a segment for each of the plurality of regions from the client; and
transmitting, by the server, to the client over the network, a segment for each of the plurality of regions selected from among the generated at least one segment for each region of the plurality of regions, and the selected segment being determined based on the information relating to the content and corresponding to the quality for each of the plurality of regions selected by the client.

11. The method of claim 10, further comprising:
generating additional information comprising importance information with respect to the plurality of regions and segment information with respect to the at least one segment for each region of the plurality of regions; and
transmitting the additional information to the client over the network,
wherein the importance information with respect to the plurality of regions comprises at least one of complexity information with respect to the plurality of regions, object state information, and information about whether viewing is possible; and
wherein the segment information comprises at least one of quality information of the at least one segment for each region of the plurality of regions and location information of the at least one segment for each region of the plurality of regions within the predetermined frame.

12. The method of claim 11, wherein the generating of the additional information comprises:
determining the quality for each network state with respect to each of the plurality of regions, based on the importance information with respect to the plurality of regions; and
generating the additional information comprising the segment information and information indicating the quality for each network state.

13. The method of claim 10,
wherein the quality for each region of the plurality of regions from the quality configuration candidate group for each region of the plurality of regions is selected based on the importance information with respect to the plurality of regions.

14. The method of claim 10, further comprising:
receiving region of interest information from the client,
wherein the quality configuration candidate group for each of the plurality of regions is generated; based on the region of interest information and the state of the network, and
the quality for each region of the plurality of regions from the quality configuration candidate group for each region of the plurality of regions is selected based on the importance information with respect to the plurality of regions.

15. An apparatus for receiving streaming data, the apparatus comprising:
a processor;
a memory storing instructions executable by the processor;
wherein the processor is configured to:
inspect a state of a network;
select a quality for each region of a plurality of regions divided from a predetermined frame of content;
request a server for information relating to the content to differentially determine quality of the plurality of regions divided from the predetermined frame of the content according to the state of the network, and receive, from the server over the network, the information relating to the content and a segment for each region of the plurality of regions selected from among at least one segment for each region of the plurality of regions, the at least one segment being generated by encoding each region of the plurality of regions according to at least one quality for each region of the plurality of regions, and the selected segment being determined based on the information relating to the content and corresponding to the selected quality;
generate a reconstruction image for each region of the plurality of regions by decoding the received segment for each region of the plurality of regions; and
merge and render the reconstruction image for each region of the plurality of regions,
wherein the processor is further configured to generate a quality configuration candidate group for each of the plurality of regions based on the state of the network and the information relating to the content and select the quality based on the quality configuration candidate group.

* * * * *